US011205426B2

(12) United States Patent
Saito et al.

(10) Patent No.: US 11,205,426 B2
(45) Date of Patent: Dec. 21, 2021

(54) INFORMATION PROCESSING DEVICE, INFORMATION PROCESSING METHOD, AND PROGRAM

(71) Applicant: SONY CORPORATION, Tokyo (JP)

(72) Inventors: Mari Saito, Kanagawa (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 16/482,508

(22) PCT Filed: Jan. 19, 2018

(86) PCT No.: PCT/JP2018/001535
§ 371 (c)(1),
(2) Date: Jul. 31, 2019

(87) PCT Pub. No.: WO2018/155026
PCT Pub. Date: Aug. 30, 2018

(65) Prior Publication Data
US 2020/0013401 A1    Jan. 9, 2020

(30) Foreign Application Priority Data

Feb. 27, 2017    (JP) .............................. JP2017-034588

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/013* (2013.01); *G06F 3/165* (2013.01); *G06F 3/167* (2013.01);
(Continued)

(58) Field of Classification Search
CPC ...... G06F 3/012; G06F 3/013; G06F 3/04883; G06F 3/165; G06F 3/167;
(Continued)

(56) References Cited

U.S. PATENT DOCUMENTS 4,973,149 A * 11/1990 Hutchinson ............ A61B 3/113
351/210
5,333,029 A *  7/1994 Uchiyama .............. G02B 7/287
396/234
(Continued)

FOREIGN PATENT DOCUMENTS

CN    102655576 A    9/2012
CN    103918284 A    7/2014
(Continued)

OTHER PUBLICATIONS

Yonezawa et al., Interactive Guide Plate with Gaze-communicative Stuffed-toy Robot, Technical Report of IEICE, Mar. 2008, pp. 1-6, The Institute of Electronics, Information and Communication Engineers.

(Continued)

*Primary Examiner* — Gerald Gauthier
(74) *Attorney, Agent, or Firm* — Paratus Law Group, PLLC

(57) ABSTRACT

An information processing device according to an aspect of the present technology includes a user information acquiring unit, an object information acquiring unit, and an output control unit. The user information acquiring unit acquires information related to a gaze position of a user while a substance of content is being automatically reproduced, in accordance with a first control amount, from an audio source located in a space in which the user is located. The object information acquiring unit acquires position information related to the audio source and position information related to a first object gazed at by the user. The output control unit (Continued)

performs first output control of providing the user with the substance of the content in accordance with a second control amount different from the first control amount in a case where the gaze position within the first object moves toward the audio source.

20 Claims, 17 Drawing Sheets

(51) Int. Cl.
*G06F 3/16* (2006.01)
*G10L 25/84* (2013.01)

(52) U.S. Cl.
CPC ........ *G10L 25/84* (2013.01); *G06F 2203/011* (2013.01); *G10L 2015/223* (2013.01); *G10L 2015/225* (2013.01)

(58) Field of Classification Search
CPC .. G06F 2203/011; G06F 3/011; G06F 3/0236; G06F 3/0482; G06F 16/433; G10L 15/22; G10L 2015/223; G10L 2015/225; G10L 25/84; G10L 17/00; H04N 7/144; H04N 21/4223; H04S 7/304; G02B 27/0093; G06K 9/00597
USPC ......... 250/221; 345/156, 211, 158; 381/313, 381/119; 396/51; 704/275, 251; 348/164; 351/209, 210; 382/104
See application file for complete search history.

(56) References Cited

U.S. PATENT DOCUMENTS

| | | | | |
|---|---|---|---|---|
| 5,517,021 | A * | 5/1996 | Kaufman | G06F 3/013 250/221 |
| 5,835,083 | A * | 11/1998 | Nielsen | G06F 1/3231 345/211 |
| 6,152,563 | A * | 11/2000 | Hutchinson | A61B 3/113 351/209 |
| 9,451,210 | B1 * | 9/2016 | Smus | G06F 3/04842 |
| 2006/0133624 | A1 * | 6/2006 | Waserblat | H04H 60/04 381/119 |
| 2008/0221877 | A1 | 9/2008 | Sumita | |
| 2009/0292541 | A1 * | 11/2009 | Daya | G10L 15/063 704/251 |
| 2010/0074460 | A1 * | 3/2010 | Marzetta | H04R 25/407 381/313 |
| 2013/0304479 | A1 * | 11/2013 | Teller | G06F 3/0481 704/275 |
| 2014/0348389 | A1 * | 11/2014 | Graumann | B60W 50/08 382/104 |
| 2014/0361977 | A1 * | 12/2014 | Stafford | A63F 13/212 345/156 |
| 2015/0009334 | A1 * | 1/2015 | Kwon | G06F 3/013 348/164 |
| 2015/0145777 | A1 * | 5/2015 | He | G06F 3/0325 345/158 |
| 2016/0080874 | A1 * | 3/2016 | Fullam | G06F 3/167 381/313 |
| 2016/0109947 | A1 * | 4/2016 | George-Svahn | G06F 3/03547 345/156 |
| 2016/0320837 | A1 * | 11/2016 | Swedish | G06K 9/00604 |
| 2016/0328130 | A1 * | 11/2016 | Patel | H04N 21/6581 |
| 2017/0038837 | A1 * | 2/2017 | Faaborg | G06T 7/70 |
| 2017/0090566 | A1 * | 3/2017 | George-Svahn | G06F 3/013 |
| 2017/0123492 | A1 * | 5/2017 | Marggraff | H04N 5/247 |
| 2018/0004288 | A1 * | 1/2018 | Noda | G06F 3/0482 |
| 2018/0020312 | A1 * | 1/2018 | Visser | G06F 3/017 |
| 2018/0032612 | A1 * | 2/2018 | Kariman | G06F 16/164 |
| 2018/0210548 | A1 * | 7/2018 | Sato | G06F 40/174 |
| 2018/0321903 | A1 * | 11/2018 | Vennstrom | G02B 27/00 |
| 2020/0013401 | A1 * | 1/2020 | Saito | G06F 3/013 |
| 2020/0105278 | A1 * | 4/2020 | Ziv | G10L 17/00 |
| 2020/0252740 | A1 * | 8/2020 | Hammerschmidt | H04S 7/304 |
| 2021/0247614 | A1 * | 8/2021 | Hudman | G02B 5/3083 |

FOREIGN PATENT DOCUMENTS

| | | |
|---|---|---|
| CN | 105899337 A | 8/2016 |
| JP | 2008-217444 A | 9/2008 |
| JP | 2013-101248 A | 5/2013 |
| WO | WO 2013/049755 A1 | 4/2013 |
| WO | WO 2016/008354 A1 | 1/2016 |

OTHER PUBLICATIONS

Komaki et al., A Service Control Method based on Face Movement Trajectory, IPSJ SIG Technical Reports, Feb. 16, 2006, pp. 103-108.

Ivan Marsic et al., Natural Communication with Information Systems, Proceedings of the IEEE, Aug. 2000, pp. 1354-1366, vol. 88, No. 8, IEEE.

Jiang Jing, The Entity Museum Exhibition Oriented Audio Augmented Environment Design Research, Dissertation for the Master Degree in Arts, Jul. 2012, pp. i-51, Harbin Institute of Technology.

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2018/001535 (filed on Jan. 19, 2018) under 35 U.S.C. § 371, which claims priority to Japanese Patent Application No. 2017-034588 (filed on Feb. 27, 2017), which are all hereby incorporated by reference in their entirety.

TECHNICAL FIELD

The present technology relates to an information processing device, an information processing method, and a program which are applicable to content reproduction control.

BACKGROUND ART

Provision of tag information using a cocktail party effect is disclosed in Patent Literature 1. If a user holds a speaker of a portable terminal to an ear, the portable terminal simultaneously outputs tag information associated with a surrounding position by voice. Human beings can naturally distinguish words or a conversation in which they are interested even in situations in which various noises exist (cocktail party effect). Therefore, it is possible to quickly select tag information of interest from among the tag information which is output simultaneously and acquire detailed information of the tag information (Description paragraphs [0027] to [0029], [0050] to [0052], FIGS. 3 and 9, and the like of Patent Literature 1).

CITATION LIST

Patent Literature

Patent Literature 1: JP-A-2013-101248

DISCLOSURE OF INVENTION

Technical Problem

There is a need for a technique capable of efficiently providing information to humans such as an information provision method using such a human characteristic. For example, it is desirable to provide the substance of content efficiently for content reproduction control as well.

In light of the foregoing, it is an object of the present technology to provide an information processing device, an information processing method, and a program which are capable of efficiently providing the substance of content.

Solution to Problem

In order to achieve the above object, an information processing device according to an aspect of the present technology includes a user information acquiring unit, an object information acquiring unit, and an output control unit. The user information acquiring unit acquires information related to a gaze position of a user while a substance of content is being automatically reproduced, in accordance with a first control amount, from an audio source located in a space in which the user is located. The object information acquiring unit that acquires position information related to the audio source and position information related to a first object gazed at by the user. The output control unit performs first output control of providing the user with the substance of the content in accordance with a second control amount different from the first control amount in a case where the gaze position within the first object moves toward the audio source.

In this information processing device, the information related to the gaze position of the user, the position information of the audio source that reproduces the content, and the position information of the first object gazed at by the user are acquired respectively. Then, the first output control is executed in a case where the gaze position within the first object moves toward the audio source. Accordingly, for example, it is possible to perform reproduction control according to a reaction of the user or the like and to provide the substance of the content efficiently.

An information processing method according to an aspect of the present technology is an information processing method executed by a computer system and includes acquiring information related to a gaze position of a user while a substance of content is being automatically reproduced, in accordance with a first control amount, from an audio source located in a space in which the user is located. Position information related to the audio source and position information related to a first object gazed at by the user are acquired. First output control of providing the user with the substance of the content is performed in accordance with a second control amount different from the first control amount in a case where the gaze position within the first object moves toward the audio source.

A program according to an aspect of the present technology causes a computer system to execute the following steps:

a step of acquiring information related to a gaze position of a user while a substance of content is being automatically reproduced, in accordance with a first control amount, from an audio source located in a space in which the user is located;

a step of acquiring position information related to the audio source and position information related to a first object gazed at by the user; and a step of performing first output control of providing the user with the substance of the content in accordance with a second control amount different from the first control amount in a case where the gaze position within the first object moves toward the audio source.

Advantageous Effects of Invention

As described above, according to the present technology, it is possible to provide the substance of content efficiently. Note that the effects described herein are not necessarily limited, and any of effects described in the present disclosure may be included.

MODE(S) FOR CARRYING OUT THE INVENTION

Hereinafter, an embodiment of the present technology will be described with reference to the appended drawings.

[Configuration of Content Provision System]

Figure 1:
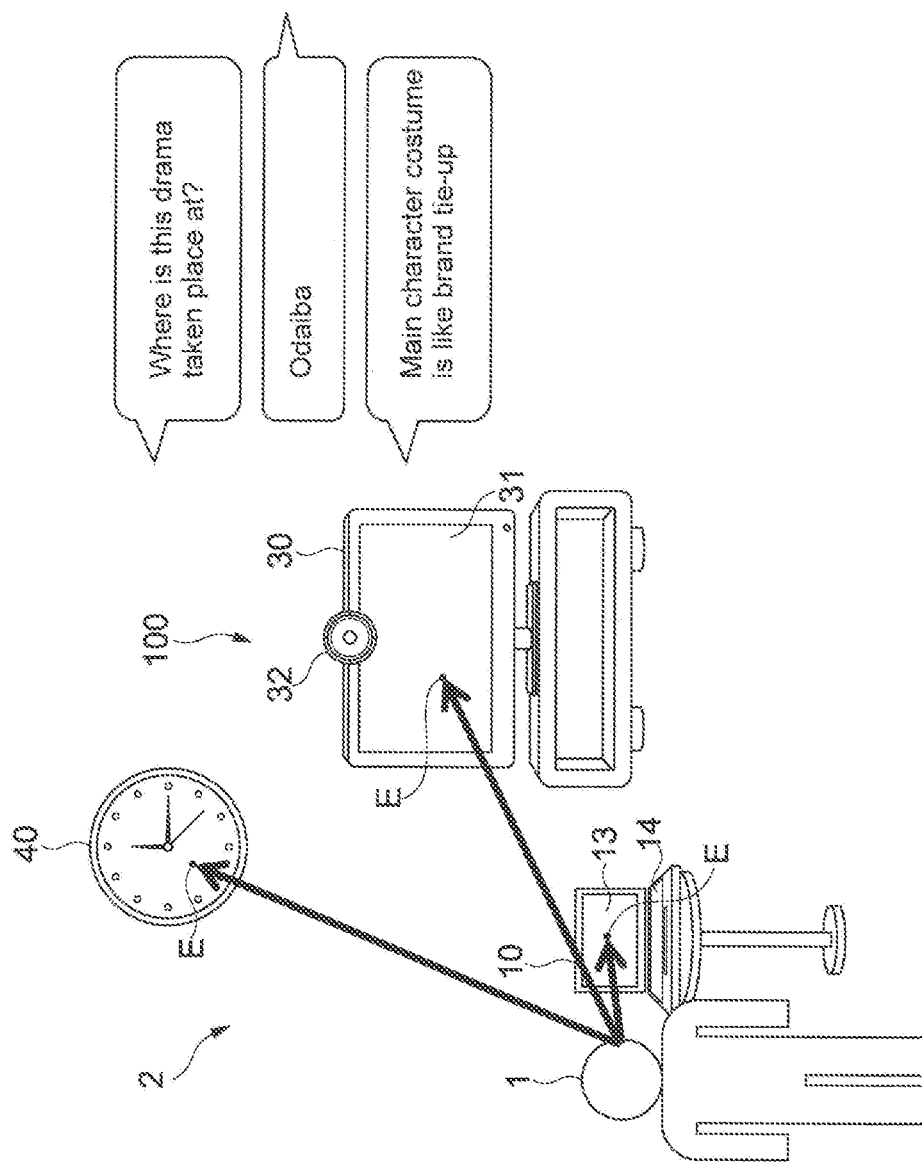
FIG. 1 is a schematic diagram illustrating a configuration example of a content provision system according to an embodiment.
Figure 2:
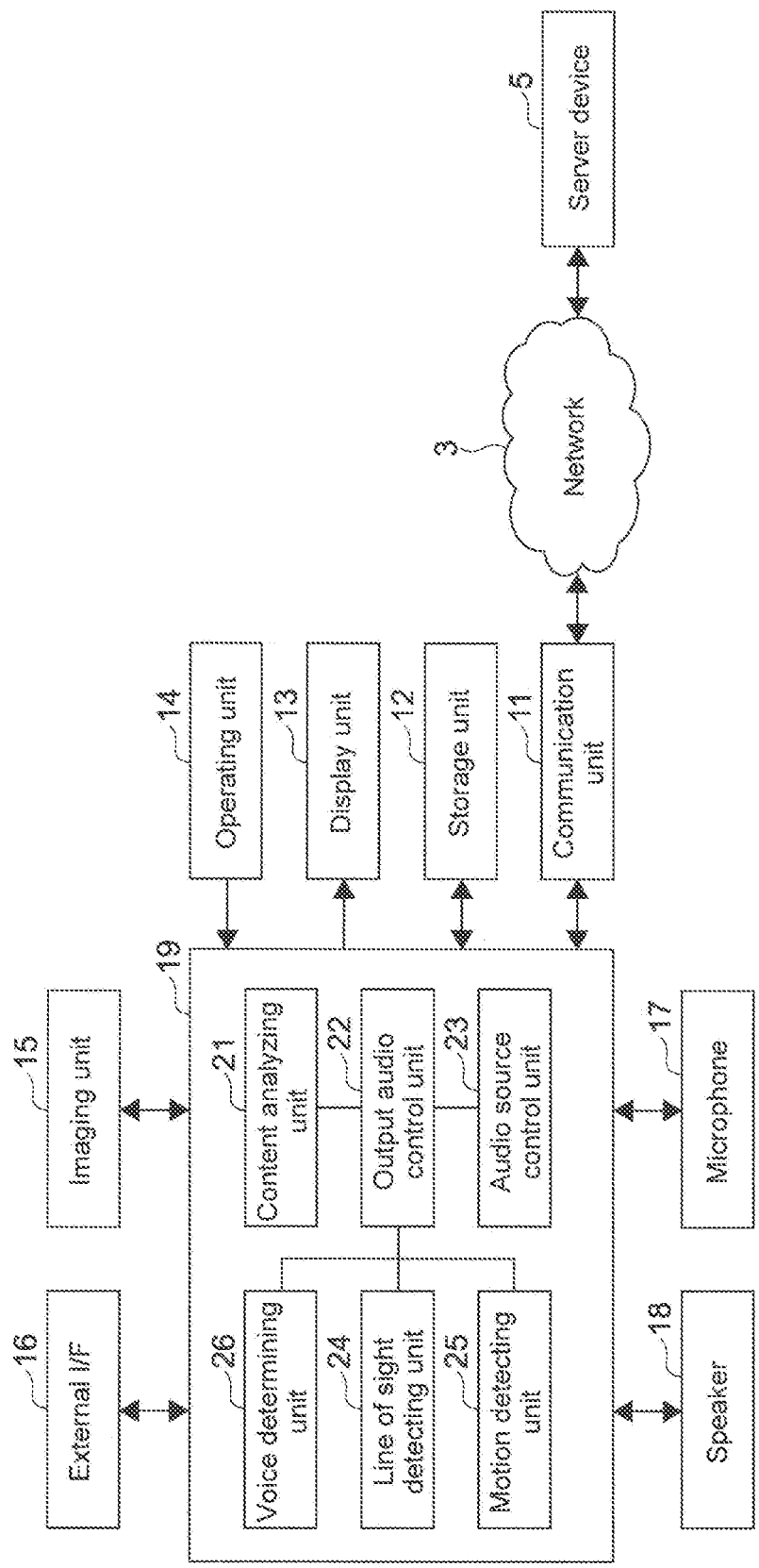
FIG. 2 is a block diagram illustrating a functional configuration example of a personal computer (PC) functioning as an information processing device according to the present embodiment.

FIG. 1 is a schematic diagram illustrating a configuration example of a content provision system according to an embodiment of the present technology. FIG. 2 is a block diagram illustrating a functional configuration example of a personal computer (PC) functioning as an information processing device according to the present embodiment.

As illustrated in FIG. 1, a content provision system 100 includes a PC 10 used by a user 1 and a television device 30 functioning as an audio source that reproduces content. The PC 10 is a device on which the user 1 performs a work and corresponds to a first object at which the user 1 gazes in the present embodiment.

As illustrated in FIG. 2, the PC 10 includes a communication unit 11, a storage unit 12, a display unit 13, an operating unit 14, an imaging unit 15, an external I/F (interface) 16, a microphone 17, a speaker 18 and a controller 19.

The communication unit 11 is a communication module for communicating with other devices via a network such as a local area network (LAN) or a wide area network (WAN). A communication module for near field communication such as Bluetooth (a registered trademark) may be installed. Also, a communication device such as a modem or a router may be used.

In the present embodiment, the PC 10 is communicably connected to various server devices 5 on a network 3 via the communication unit 11. The server devices 5 include, for example, any types of server devices such as a web server that provides various web services and an e-mail server.

For example, it is possible to establish a connection with the server device 5 that provides a social networking service (SNS) such as LINE (registered trademark) or Twitter (registered trademark) or a messenger service such as Skype (registered trademark) via the communication unit 11. The user 1 can use these services (applications) via the PC 10. In addition, it is possible to use various web services such as services for realizing communication by augmented reality (AR), virtual reality (VR), or the like and a news distribution service.

The storage unit 12 is a non-volatile storage device such as a hard disk drive (HDD), a solid-state drive (SSD), a flash memory, or other solid-state memory.

The storage unit 12 stores a control program for controlling an overall operation of the PC 10, an application program for executing an information processing method according to the present technology, and various data. A method of installing the application program or the like in the PC 10 is not limited. For example, the installation may be performed by an arbitrary method via various recording mediums, networks, or the like.

The display unit 13 is a display device using, for example, a liquid crystal, electro-luminescence (EL), or the like. Examples of the operating unit 14 include a keyboard, a pointing device, a touch panel, and other operation devices. In a case in which the operating unit 14 includes a touch panel, the touch panel can be integrated with the display unit 13.

The imaging unit 15 can image a face, an upper body, and the like of the user 1 using the PC 10. As the imaging unit 15, for example, a digital camera including an image sensor such as a complementary metal oxide semiconductor (CMOS) or a charge coupled devices (CCD) sensor is used.

The external I/F 16 is an interface that establishes a connection with an external device on the basis of a standard such as a USB or a high-definition multimedia interface (HDMI). The microphone 17 can collect a voice spoken by the user 1. The speaker 18 can output a voice.

The controller 19 includes hardware necessary for a configuration of a computer such as a central processing unit (CPU), a read only memory (ROM), and a random-access memory (RAM). As the CPU loads a control program stored in the storage unit 12 onto the RAM and executes the control program, various processes are executed.

A specific configuration of the controller 19 is not limited, and for example, devices such as a field programmable gate array (FPGA), an image processing integrated circuit (IC), or other application specific integrated circuits (ASICs) may be used.

In the present embodiment, as the CPU of the controller 19 executes a program according to the present embodiment, a content analyzing unit 21, an output audio control unit 22, an audio source control unit 23, a line of sight detecting unit 24, a motion detecting unit 25, and a voice determining unit 26 are realized as functional blocks. Dedicated hardware may be used appropriately to implement each functional block.

As illustrated in FIG. 1, the television device 30 functioning as the audio source includes a display unit 31 and a speaker 32 which is schematically illustrated. In the present embodiment, the audio source control unit 23 of the PC 10 controls an operation of each of the display unit 31 and the speaker 32 of the television device 30.

For example, network communication or near field communication is established between the PC 10 and the television device 30 via the communication unit 11, and a control signal is transmitted therebetween. Alternatively, the control signal may be transmitted via the external I/F 38 in a wired or wireless manner. In addition, an arbitrary communication method such as infrared (IR) communication may be used.

(Acquisition of User Information)

In the present embodiment, the PC 10 acquires various user information related to the user 1. For example, information related to a gaze position E of the user 1 is included as the user information. The information related to the gaze position E is information from which the gaze position E of the user 1 can be detected or estimated and is typically information of a line of sight direction of the user 1. Of course, the information related to the gaze position E is not limited to the information of the line of sight direction, and other information may be acquired as the information related to the gaze position E. Further, information related to the gaze position E itself may be acquired as the information related to the gaze position E.

In the present embodiment, the line of sight detecting unit 24 detects the line of sight direction of the user 1 on the basis of an image of the user 1 captured by the imaging unit 15. Then, the gaze position E of the user 1 is estimated. For example, the line of sight direction may be detected on the basis of an image of the eye of the user 1, or the line of sight direction may be detected on the basis of a direction of the head (face) of the user 1. Besides, other arbitrary algorithms may be employed, and machine learning such as deep learning may be used. In the present embodiment, the imaging unit 15 and the line of sight detecting unit 24 function as a user information acquiring unit.

Note that the information related to the gaze position E of the user 1 may be generated by a device or the like different from the PC 10 and transmitted to the PC 10 via the communication unit 11 or the external I/F 16. For example, a camera is installed on the television device 30 side, and information such as the line of sight direction of the user 1 is detected on the basis of a captured image of a camera. The information such as the detected line of sight direction may be transmitted to the PC 10 via the communication unit 11 or the like as the information related to the gaze position E. In this case, the communication unit 11 or the like that receives the information related to the gaze position E functions as the user information acquiring unit.

Also, in the present embodiment, information related to a behavior of the user 1 different from the information related to the gaze position E is acquired as the user information. The information related to the behavior of the user 1 includes information related to the amount of activity of the user 1, and when the amount of activity of the user 1 is small, an information amount of the behavior of the user 1 is small. When the amount of activity of the user 1 is large, the information amount of the behavior of the user 1 is large.

For example, the motion detecting unit 25 detects an expression, a posture, a face (head) motion, a hand motion, or the like of the user 1 on the basis of the image of the user 1 captured by the imaging unit 15. Then, the information related to the behavior of the user 1 is generated on the basis of a change in posture or hand motion or the like.

For example, when the expression changes, the upper body is moving, the face (head) is shaking from side to side, and the user is operating the keyboard (the operating unit 14) of the PC 10 with both hands, the information amount related to the behavior of the user 1 increases. On the other hand, when the movement of the upper body stops, the face (head) motion stops, the motion of both hands stops, or the like, the information amount of the information related to the behavior of the user 1 decreases.

Further, specific information of a type of behavior which the user 1 is doing, that is, information such as "operating the keyboard (the operating unit 14) of the PC 10 with both hands," "movement of both hands stopped," or the like may be included in the information related to the behavior of the user 1. The information related to the behavior of the user 1 can be acquired by an arbitrary technique such as, for example, behavior analysis using machine learning. The motion detecting unit 25 functions as the user information acquiring unit.

Further, the present invention is not limited to a case in which the captured image of the user 1 is used, and the information related to the behavior of the user 1 may be generated on the basis of the presence or absence of an operation on the PC 10 operated by the user 1 and an operation amount. For example, the information related to the behavior of the user 1 may be generated on the basis of the operation amount on the keyboard, a movement amount of the mouse, or the like. Further, generation of the information related to the behavior of the user 1 and transmission to the PC 10 may be generated by a device different from the PC 10. In this case, the communication unit 11 or the like functions as the user information acquiring unit.

Also, in the present embodiment, information related to the voice of the user 1 is acquired as the user information. The information related to the voice of the user 1 includes, for example, the voice of the user 1 collected by the microphone 17 and various types of information related to the voice.

In the present embodiment, the voice determining unit 26 determines whether or not the voice of the user 1 is a linguistic voice or not. The linguistic voice is a voice that constitutes a meaningful language, and it is possible to execute the determination by using an arbitrary speech analysis technique using, for example, machine learning.

In the present embodiment, the determination result of whether or not the user 1 is a linguistic voice is included in the information related to the voice of the user 1. Further, the determination result indicating that the user 1 is not a linguistic voice corresponds to information related to a non-lingual voice. For example, the non-linguistic voices such as "Oh!" and "Yeah?" that do not constitute a meaningful language are assumed to be spoken by the user 1. Then, the voice determining unit 26 determines that the voice of the user 1 is not a linguistic voice. The acquisition of the determination result corresponds to the acquisition of the information of the non-lingual voice. Of course, the voice determining unit 26 may determine whether or not the voice of the user 1 is the non-lingual voice.

For example, a language used for voice input may be registered in the PC 10 in advance, and it may be determined whether or not the voice collected by the microphone 17 is a voice constituting the registered language. In this case, when the voice of the user 1 does not constitute the language registered for voice input, it may be processed as a meaningless non-lingual voice. In other words, the determination result indicating that the voice of the user 1 is not the voice of the language registered for voice input may be dealt as the information related to the non-lingual voice.

(Acquisition of Object Information)

Also, in the present embodiment, object information is acquired by the PC 10. The object information includes position information related to the television device 30 located in a space 2 in which the user 1 is located, position information related to the PC 10 which is a first object, and position information related to a second object different from the audio source located in the space 2.

The second object different from the audio source is typically an object that the user 1 is likely to gaze at and can be regarded as an object with a degree of attention. In the example illustrated in FIG. 1, a timepiece 40 is illustrated as the second object. The present technology is not limited thereto, and a calendar, a fixed telephone, a book shelve, or the like may be regarded as the second object. Further, people such as a family or animals such as pets are also regarded as the second object. The number of second objects located in the space 2 is not limited.

In the present embodiment, reference position information and boundary position information are acquired as position information related to the television device 30. The reference position information is position information of a predetermined reference point of the television device 30. The reference point may be set to any position such as, for example, the center of the display unit 31 of the television device 30 or the position of the speaker 32. In the present embodiment, a reference point S1 is set to the center of the display unit 31 (see FIG. 5).

The boundary position information is position information of the boundary between the inside and the outside of the television device 30. Typically, position information of an edge B1 of the television device 30 is used as the boundary position information (see FIG. 5). As described later with reference to FIG. 5, the reference position information is used to determine whether or not the gaze position E of the user 1 is moving toward the television device 30. The boundary position information is used to determine whether the gaze position E is within the television device 30 or outside the television device 30.

Similarly, reference position information which is the position information of a predetermined reference point of the PC 10 is acquired as the position information related to the PC 10. Further, the boundary position information is acquired to define the inside and the outside of the PC 10. For example, position information of a reference point S2 set to the center of display unit 13 is used as the reference position information. Position information of an edge B2 of the display unit 13 or the like is used as the boundary position information (see FIG. 5).

The reference position information and the boundary position information are also obtained for the position information related to the timepiece 40 which is the second object. For example, position information of a reference point S3 set to the center of timepiece 40 is acquired as the reference position information, and position information of an edge B3 of the timepiece 40 is acquired as the boundary position information (see FIG. 5).

A method of acquiring the position information related to each of the television device 30, the PC 10, and the timepiece 40 is not limited. For example, the entire space 2 may be photographed by the imaging unit 15 of the PC 10, and position information related to each device may be generated by the PC 10 on the basis of the captured image. In this case, for example, a functional block for generating the position information realized by the controller 19 functions as an object information acquiring unit.

Alternatively, the position information related to each device may be generated by another device different from the PC 10 such as, for example, a map generation device placed in the space 2, a server device 5 for map generation on the network 3 or the like may be generated on the basis of the captured image or the like of the entire space 2. In this case, the communication unit 11 or the external I/F 16 that receive the generated position information function as the object information acquiring unit. Also, an algorithm or the like for generating the position information related to each device or the like is not limited, and an arbitrary algorithm including machine learning or the like may be used.

[Content Output Control]

Output control of providing the user 1 with the substance of content will be described. In the present embodiment, the content analyzing unit 21, the output audio control unit 22, and the audio source control unit 23 realize an output control unit and execute content output control.

Here, a case in which the substance of a conversation conducted by a group composed of a plurality of users including the user 1 via network 3 is reproduced by the speaker 32 of the television device 30 as schematically illustrated in FIG. 1 is will be described as an example. The user 1 is working using the PC 10 while listening to the conversation of the group output from the speaker 32.

Figure 3:
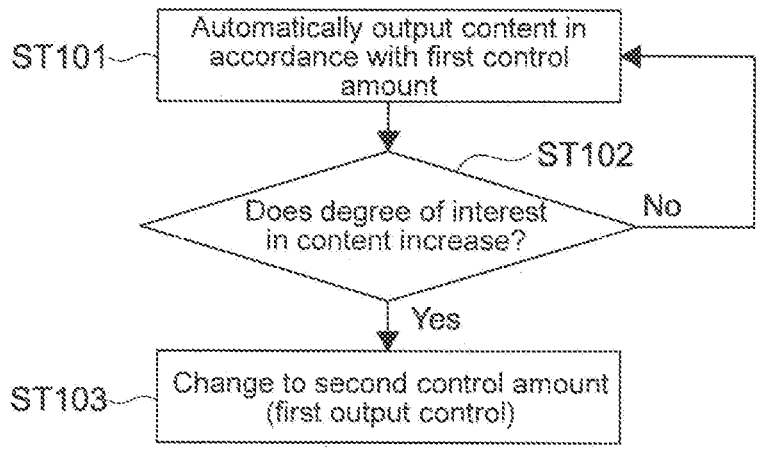
FIG. 3 is a flowchart illustrating a basic process example of content output control.

FIG. 3 is a flowchart illustrating a basic process example of the content output control. First, the substance of the conversation is automatically reproduced in accordance with a first control amount by the speaker 32 of the television device 30 (step 101).

In the present embodiment, the server device 5 on the network 3 transmits service information including the substance of the conversations in the group. The service information includes various types of information related to content such as, for example, information related to the group in which the conversation is being performed or various types of information such as a conversation start time, a speech time of each speech, a genre of conversation, a degree of excitement, and the like. The content analyzing unit 21 analyzes the substance of content (here, the substance of the conversation by the group) and various types of information related to the content on the basis of the service information and outputs the information to the output audio control unit 22.

The output audio control unit 22 performs control related to voice data output by the speaker 32 of the television device 30. In the present embodiment, the output audio control unit 22 generates voice data to be reproduced from the speaker 32. For example, when the conversation performed in the group is performed by text input, synthesized voice data obtained by voice synthesis of each conversation is generated. For example, an arbitrary text-to-speech (TTS) technique may be used.

When the conversation of the group is performed by voice input, voice data of each conversation is used as voice data to be output without change. Of course, it may be converted into text once to generate synthetic voice data.

The present invention is not limited to a case in which all conversations are output as voice, and a predetermined keyword (for example, a proper noun, a word with a high frequency of appearance, a word pronounced with emphasis, or the like) may be extracted, and voice data of the keywords may be generated. Also, the substance of the conversation may be summarized appropriately, and the summarized voice data may be generated. An arbitrary algorithm may be used to implement keyword extraction and summary generation.

Also, a frequency of the voice data may be changed for each member of the group. Also, the voice data for expressing the degree of excitement may be generated in a manner that depends on the degree of excitement. For example, when the degree of excitement is high, the voice of each member is reproduced with a high volume. Alternatively, a voice different from the conversation such as a background sound (a rumble sound) may be output. Besides, arbitrary voice output related to reproduction of the substance of content may be employed, and control for the voice data corresponding thereto is executed.

The audio source control unit 23 controls a voice output operation via the speaker 32 of the television device 30. For example, a volume, a reproduction speed, or the like of the voice output from the speaker 32 is controlled. Further, various types of control related to the voice output are possible.

As illustrated in step 101 of FIG. 3, the control for the output voice by the output audio control unit 22 and the control for the voice output operation by the audio source control unit 23 are executed in accordance with the first control amount. Here, examples of the "control amount" include a control amount related to various types of control related to reproduction of content such as a volume, a reproduction speed, an information amount of the substance of content, and a reproduction timing.

The volume and the reproduction speed are a reproduction volume and a reproduction speed of content to be reproduced. The information amount of the substance of content is an information amount of the substance to be provided to the user 1. For example, when a keyword is extracted from the substance of content and reproduced, a keyword amount corresponds to the information amount. Also, when the substance of content is summarized and reproduced, an information amount of the summary corresponds to the information amount. As the information amount of the summary increases, a detail degree of the summary of the substance of content increases.

For example, the first control amount is set to a degree at which the work of the user 1 using the PC 10 is not disturbed, and a keyword of interest or the like is picked up by the cocktail party effect. A specific volume, a specific information amount, a specific reproduction speed, and the like are not limited and may be set appropriately.

As illustrated in FIG. 3, it is determined whether or not the degree of interest of the user 1 in the content increases while the television device 30 is reproducing the substance of content automatically in accordance with the first control amount (step 102). In the present embodiment, the output audio control unit 22 executes the determination step on the basis of detection results from the line of sight detecting unit 24, the motion detecting unit 25, and the voice determining unit 26.

When the degree of interest of the user 1 in the content does not increase (No in flowchart 102), the process returns to step 101, and the reproduction of the content according to the first control amount is continued. When the degree of interest of the user 1 in the content increases (Yes in step 102), the first output control for providing the substance of content to the user 1 is executed in accordance with a second control amount. In other words, the "control amount" is changed from the first control amount to the second control amount, and the content is reproduced in accordance with the second control amount (step 103).

For example, the second control amount set at the time of the first output control is set so that the substance of content can be provided in more detail in accordance with the increase in the degree of interest of the user 1 in the content. Note that the magnitude relation between the first control amount and the second control amount differs in a manner that depends on a control parameter. For example, when the control parameter is the reproduction volume, the second control amount has a larger value than the first control amount. When the control parameter is the reproduction speed, the second control amount has a smaller value than the first control amount. Therefore, for example, when the reproduction speed and the reproduction volume are simultaneously controlled at the time of the first output control, the magnitude relation of the reproduction volume between the first control amount and the second control amount is different from the magnitude relationship of the reproduction speed between the first control amount and the second control amount. Of course, in the first output control, one type of control parameter may be used, or a combination of two or more types of control parameters may be used.

For example, the reproduction volume of the audio source is set to a large value. Therefore, the volume is increased from the speaker 32, and the substance of the content is reproduced. The production speed is set to a small value. For example, when fast forward reproduction or the like is executed at the time of reproduction according to the first control amount, the substance of the content is reproduced at the normal reproduction speed (for example, 1.3 to 2.0 times speed reproduction→+1.0 times speed). Of course, it is not necessarily limited thereto.

Also, the information amount of the substance of the content to be reproduced is set to a large value. For example, when the keyword is extracted and reproduced, an amount of keyword to be reproduced is increased. Also, when the substance of the content is summarized and reproduced, the substance of the content which is more detailed than the summary reproduced in accordance with the first control amount is reproduced. For example, a more detailed summary may be reproduced, or the substance of the content may be reproduced without being summarized.

For example, it is assumed that the keyword of interest of the user 1 comes to the ear due to the cocktail party effect or the like, and the degree of interest in the content increases. In the present embodiment, the PC 10 detects the increase in the degree of interest and executes the first output control in accordance with the second control amount. Accordingly, the user 1 can easily detect the details of the substance of the conversation including the keyword of interest.

When the increase in the degree of interest of the user 1 in the content is detected, at least a part of the substance of the content reproduced immediately before the detection timing may be reproduced. For example, the substance of the content may be rewound by a predetermined time and reproduced. Accordingly, the user 1 can trace back the substance of the conversation in which the user is interested. Further, the reproduction timing of the content may be appropriately controlled as the first output control on the basis of the timing at which the increase in the degree of interest is detected.

There are various methods of determining the increase in the degree of interest of the user 1 in the content. For example, momentary reaction of the user 1 to the keyword of interest is detected. For example, various reactions such as turning to the audio source, raising the face suddenly, raising the voice "Oh!", stopping work, body hardens, and the like can be considered, and it is possible to determine the increase in the degree of interest by detecting them.

Figure 4:
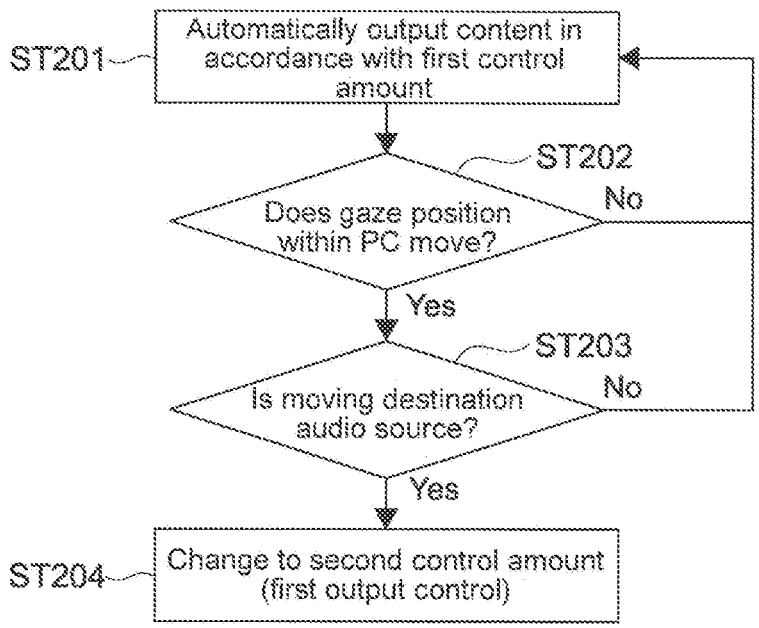
FIG. 4 is a flowchart illustrating a process example for determining an increase in a degree of interest in content.

FIG. 4 is a flowchart illustrating a process example for determining the increase in the degree of interest in the content. In step 201, it is determined whether or not the gaze position E within the PC 10 which is the first object moves while the content is being reproduced in accordance with the first control amount (step 202).

It is possible to determine whether or not the gaze position E is within the PC 10 with reference to the boundary position information of the PC 10. When the gaze position E does not move (No in step 202), the process returns to step 201, and the reproduction of the content according to the first control amount is continued.

When the gaze position E within the PC 10 moves (Yes in step 202), it is determined whether or not the moving destination is the audio device or the television device 30 (step 203). When the moving destination is not the television device 30 (No in step 203), the process returns to step 201, and the reproduction of the content according to the first control amount is continued.

When the moving destination is the television device 30 (Yes in step 203), the first control amount is changed to the second control amount, and the first output control is executed (step 204). In other words, in this example, when the gaze position E within the PC 10 moves toward the television device 30, the degree of interest in the content is determined to increase, and the first output control is executed.

Figure 5:
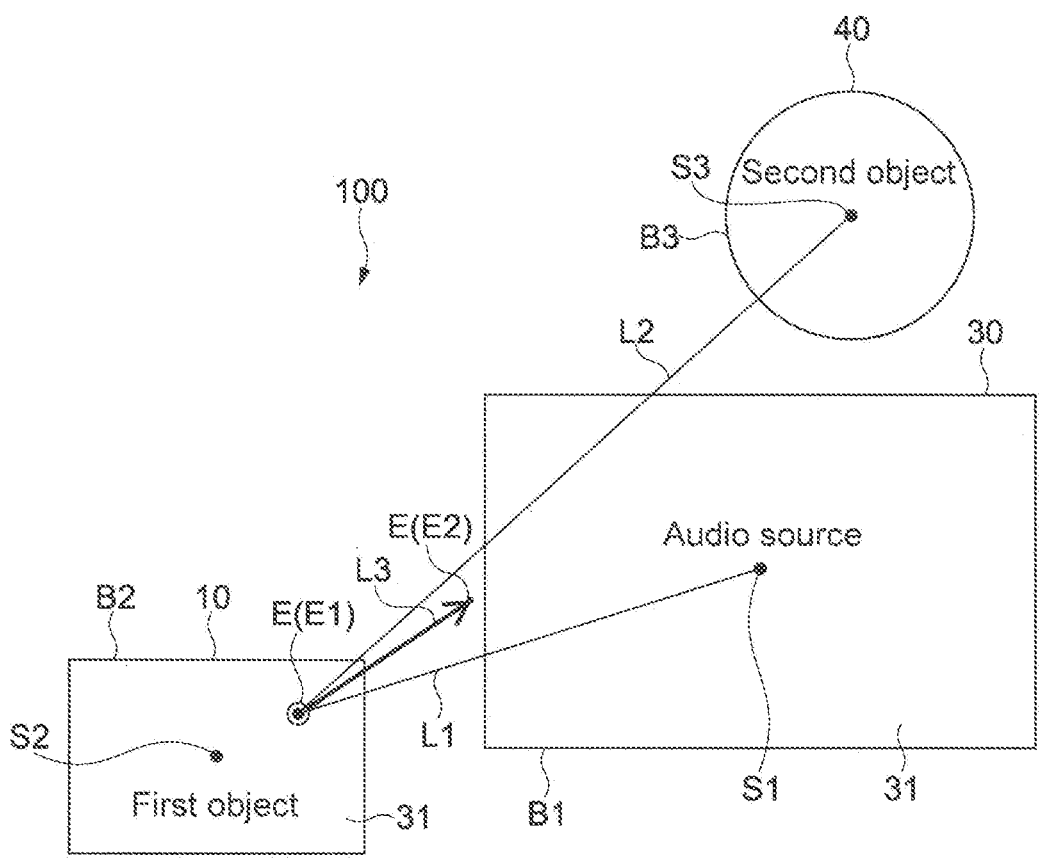
FIG. 5 is a schematic diagram for describing an example for determining whether or not a moving destination of a gaze position is an audio source.

FIG. 5 is a schematic diagram for describing an example for determining whether or not the moving destination of the gaze position E is the audio source. For example, it is assumed that the PC 10 (the first object), the television device 30 (the audio source), and the timepiece 40 (the second object) are placed as illustrated in FIG. 5. Then, it is assumed that the position information (the reference position information and the boundary position information) related to each device is stored.

The moving destination of the gaze position E can be determined on the basis of the moving direction of the gaze position E. For example, a straight line L1 connecting a gaze position E1 before movement with a reference position S1 of the television device 30 is calculated, and a direction of the straight line L1 is set as the direction from the gaze position E1 to the television device 30. Of course, a point other than the reference position S1 may be used.

Further, a straight line L2 connecting the gaze position E1 before movement with the timepiece 40 is calculated, and a direction of the straight line L2 is set as the direction from the gaze position E1 to the timepiece 40. Then, it is determined whether the moving direction (reference numeral L3) of the gaze position E connecting a gaze position E2 after the movement from the gaze position E1 before the movement is closer to a direction from the gaze position E1 to the television device 30 or a direction from the gaze position E1 to the timepiece 40. Specifically, an angle between each of the straight lines L1 and L2 and the moving direction (reference numeral L3) of the gaze position E is calculated. Then, a direction represented by a straight line with a smaller angle is determined as the direction closer to the moving direction of the gaze position E.

In the example illustrated in FIG. 5, the moving direction of the gaze position E is closer to the straight line L2 connecting the gaze position E1 with the timepiece 40. In this case, it is determined that the gaze position E is moving toward the timepiece 40 rather than the television device 30.

Therefore, No is determined in step 203, and the reproduction of the content according to the first control amount is continued.

It is determined whether or not the moving destination of the gaze position E is the television device 30 or the timepiece 40 as described above. Accordingly, it is possible to determine that the gaze position E seems to be at the television device 30, but the user 1 actually looks at the timepiece 40, and the user 1 does not react to the audio source. In other words, it is possible to determine whether or not the degree of interest in the content increases with a high degree of accuracy.

Figure 6:
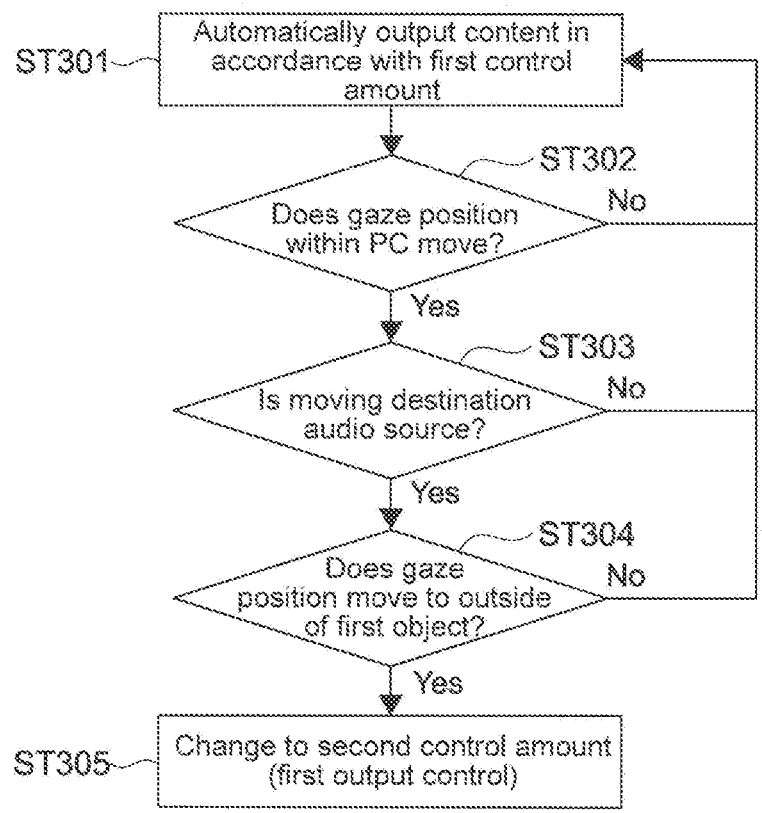
FIG. 6 is a flowchart illustrating another process example for determining an increase in a degree of interest in content.

FIG. 6 is a flowchart illustrating another process example for determining the increase in the degree of interest in the content. As illustrated in FIG. 6, when the moving destination of the gaze position E is the audio source (Yes in step 303), it may be determined whether or not the gaze position E moves to the outside of the PC 10 which is the first object (step 304). When the gaze position E does not move to the outside of the PC 10 (No in Step 304), the reproduction of the content according to the first control amount is continued (step 301). When the gaze position E moves to the outside of the PC 10 (Yes in step 304), the first output control according to the second control amount is executed (step 305).

As described above, when the gaze position E moves to the outside of the PC 10 while the gaze position E is moving toward the television device 30, the first output control is performed, and when the gaze position E remains inside the PC 10 while the gaze position E is moving toward the television device 30, the first output control may not be performed.

For example, a case in which the line of sight (the gaze position E) moves back and forth in the display unit 13 while the user 1 using the PC 10 is working is considered. By executing the process illustrated in FIG. 6, it is possible to distinguish and determine the movement of the line of sight on the display unit 13 in the work from the increase in the degree of interest in the content. As a result, it is possible to execute the first output control with a very high degree of accuracy.

Figure 7:
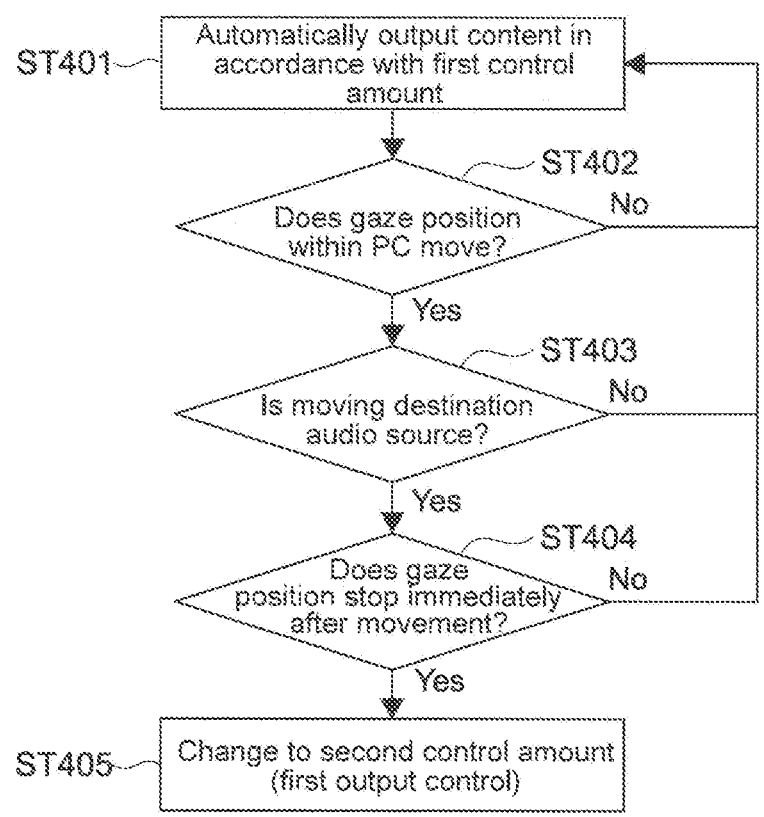
FIG. 7 is a flowchart illustrating another process example for determining an increase in a degree of interest in content.

FIG. 7 is a flowchart illustrating another process example for determining the increase in the degree of interest in the content. In the example illustrated in FIG. 7, when the moving destination of the gaze position E is the audio source (Yes in step 403), it is determined whether or not the gaze position E substantially stops immediately after the movement (step 404). Examples of a case in which the gaze position E substantially stops include both a case in which the gaze position E completely stays at the same position and a case in which the gaze position E stays within a predetermined narrow range.

When the gaze position E does not substantially stop immediately after the movement, that is, when the movement of the gaze position E continues (No in step 404), the reproduction of the content according to the first control amount is continued (step 401). When the gaze position E substantially stops (Yes in step 404), the first output control according to the second control amount is executed (step 405).

As described above, when the gaze position E substantially stops immediately after the gaze position E moves toward the television device 30, the first output control is performed, and the first output control may not be performed while the gaze position E is continuously moving toward the television device 30. Accordingly, it is possible to determine, for example, whether or not it is an instantaneous reaction to a keyword of interest or the like or it is a change in the line of sight to another object. In other words, it is possible to accurately determine the increase in the degree of interest in the content.

Figure 8:
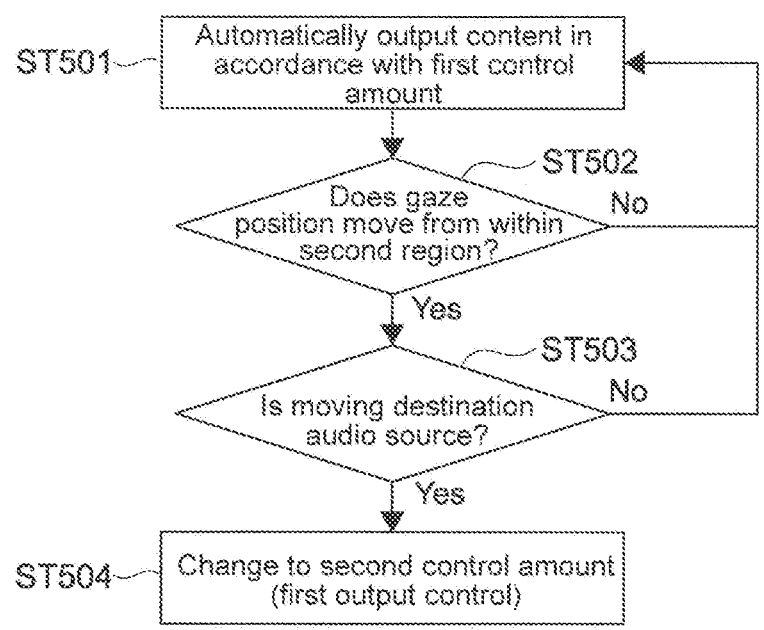
FIG. 8 is a flowchart illustrating another process example for determining an increase in a degree of interest in content.
Figure 9:
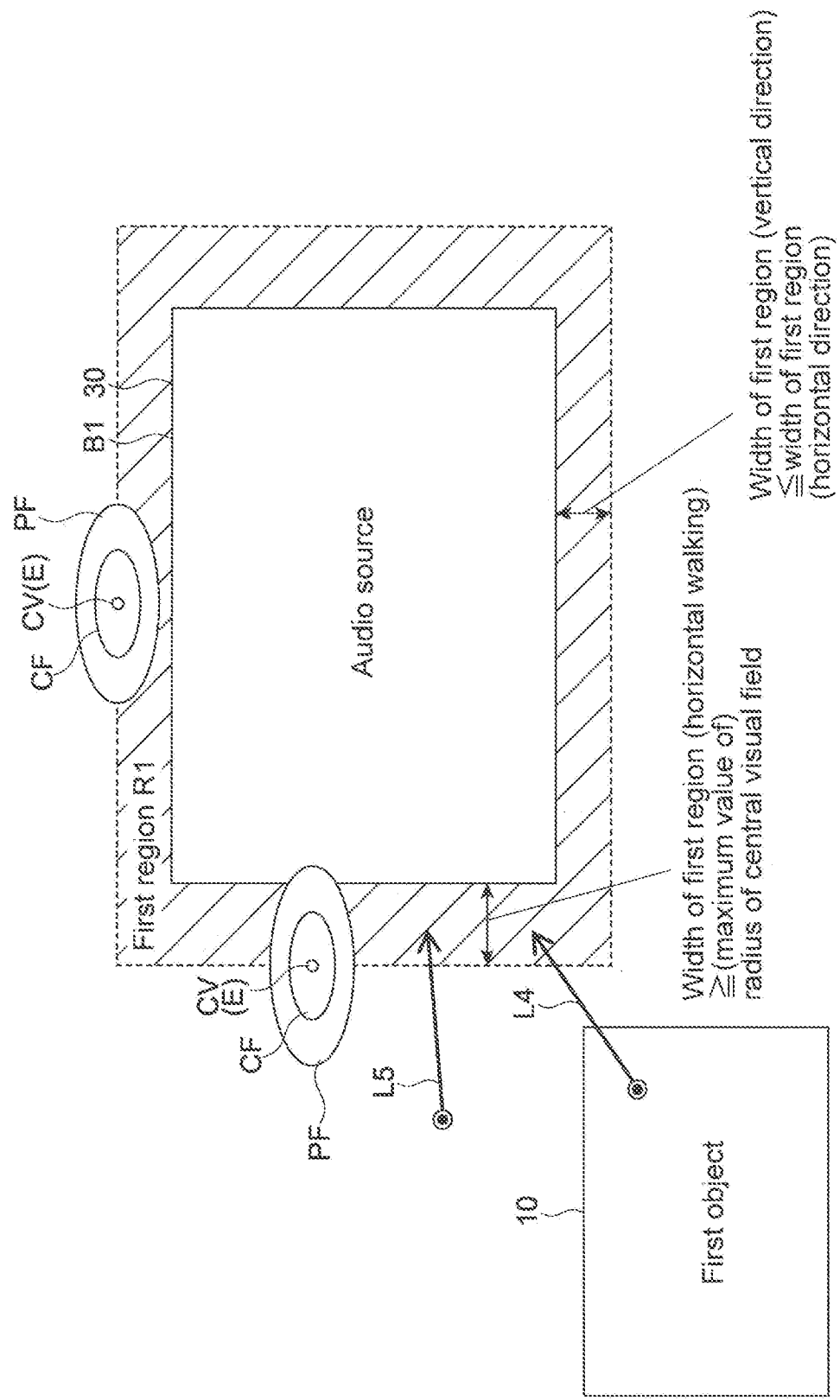
FIG. 9 is a schematic diagram for describing a setting examples of first and second regions.
Figure 10:
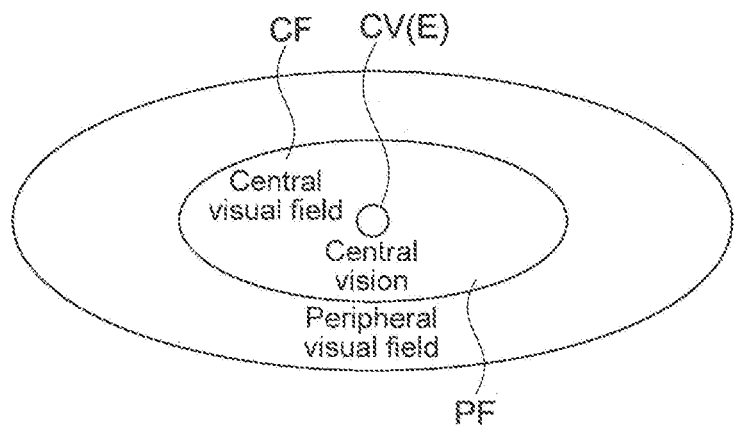
FIG. 10 is a schematic diagram for describing a human visual field characteristic.
Figure 11:
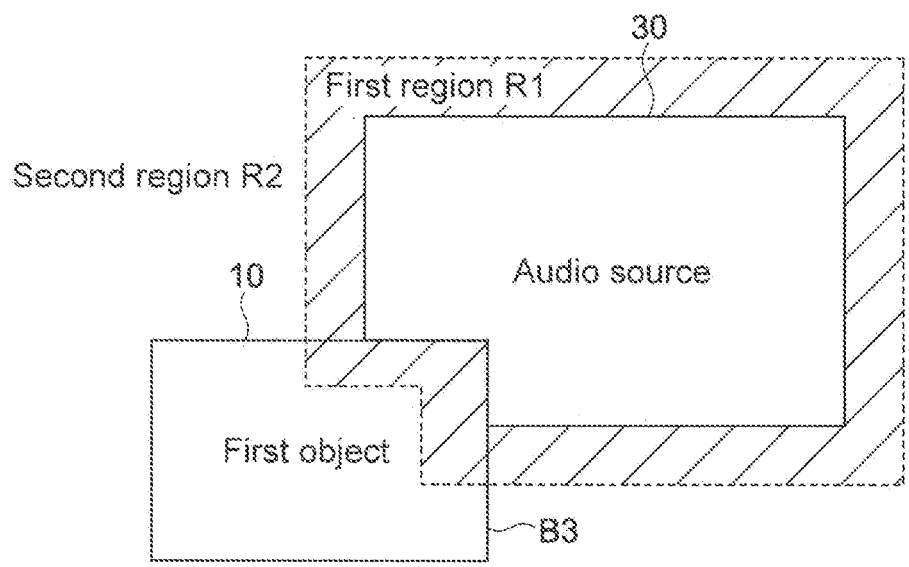
FIG. 11 is a schematic diagram for describing another setting example of first and second regions.

FIG. 8 is a flowchart illustrating another process example for determining the increase in the degree of interest in the content. FIGS. 9 to 11 are schematic diagrams for describing the process example illustrated in FIG. 8.

In the example illustrated in FIG. 8, when the gaze position E moves within from the second region R2 (see FIG. 9) toward the television device 30, the first output control is executed (Yes in step 502, Yes in step 503, and step 504).

In order to execute the present process, as illustrated in FIG. 9, a first region R1 surrounding the television device 30 (audio source) is set. For example, a region of a size corresponding to a predetermined width with respect to an edge b1 of the television device 30 is set as the first region R1. The sizes of the widths from the edge B1 may all be set to the same size, or a different width may be set for each of the edge B1.

A second region R2 is set to the outside of the first region R1. In other words, in the example illustrated in FIG. 8, the increase in the degree of interest of the user 1 in the content is determined by detecting the motion of moving the line of sight (the gaze position E) toward the television device 30 from the state in which the user 1 does not look at the television device 30.

Since the first region R1 is set around the television device 30, and the outside is set as the second region R2, it is possible to detect the change in the line of sight to the television device 30 with a high degree of accuracy. In other words, it is possible to detect the increase in the interest in the content.

In the process illustrated in FIG. 8, steps 502 and 503 are executed regardless of whether or not the gaze position E before the movement is with the PC 10. In other words, both of the movements of the gaze position E of reference numerals L4 and L5 illustrated in FIG. 9 satisfy the conditions for executing the first output control. Of course, when the gaze position E is within the PC 10 and within the second region R2, and the gaze position E is moved toward the television device 30 from there, the first output control may be executed.

As schematically illustrated in FIG. 10, the human visual fields can be classified into a central visual field CF and a peripheral visual field PF. The central visual field CF is a region looked at by the user 1 centered on a central vision CV and is a region in which an object can fully be recognized. Typically, the position of the central vision CV which is the center of the central visual field CF corresponds to the gaze position E. The peripheral visual field PF is a region around the central visual field CF and is a region in which an object can be vaguely recognized.

It is possible to set the width of the first region R1 on the basis of such a human visual field characteristic. Specifically, it is possible to set the width of the first region R1 on the basis of the radius of the central visual field CF with reference to the view point of the user 1. For example, the radius of the central visual field CF based on the view point of the user 1 is calculated on the basis of a distance from the PC 10 to the television device 30 (the distance from the user 1 to the audio source). Alternatively, a predetermined value may be used as the radius of the central visual field CF. Also, the central visual field CF typically has an elliptical shape. In the present disclosure, the "radius of the central visual field" includes various values such as a radius in one direction such as a horizontal direction or a vertical direction or a maximum value or an average value of the radiuses in the respective directions.

For example, the width of the first region R1 in the horizontal direction is set to a size equal to or more than half the maximum value of the radius of the central visual field CF (typically, the radius in the horizontal direction). The width of the first region R1 in the vertical direction is set to a value equal to or more than half the radius of the central visual field CF in the vertical direction.

Accordingly, the gaze position E (the central vision CV) is included in the first region R in the state in which the central visual field CF overlaps the television device 30. In other words, the state in which the central visual field CF overlaps the television device 30 while the gaze position E is within the second region R2 is excluded. As a result, it is possible to define a region in which the user 1 does not look directly at the television device 30 as the second region R2. As a result, it is possible to detect the motion of moving the line of sight toward the television device 30 from the state in which the user 1 does not look at the television device 30 with a high degree of accuracy. It is also possible to start the first output control according to the second control amount before the user 1 looks at the television device 30.

Further, as illustrated in FIG. 9, the width of the first region R1 in the vertical direction is set to be smaller than the width in the horizontal direction in consideration of the visual field characteristic of the user 1. Accordingly, it is possible to determine the increase in the degree of interest caused by the movement of line of sight with a high degree of accuracy. Also, the accuracy of determination associated with the movement of the line of sight in the horizontal direction which is the main moving direction of the visual field of the user is improved.

As illustrated in FIG. 11, the first object PC 10 and the television device 30 serving as the audio source overlap may overlap with respect to the view point of the user 1. In this case, the first region R1 may be set for the overlapping part with reference to an edge B3 of the PC 10. Accordingly, it is possible to accurately detect whether or not the movement of the gaze position E to the television device 30 in the overlapping part is the increase in the degree of interest in the content.

For example, in order to determine the increase in the degree of interest in the content, when the gaze position E is within the PC 10, it is determined whether or not the gaze position E moves from the PC 10 toward the television device 30. When the gaze position E is outside the PC 10, it is determined whether or not the gaze position E moves from the second region R2 toward the television device 30. When such a process is performed, the first region R1 may not be set in the overlapping part.

Figure 12:
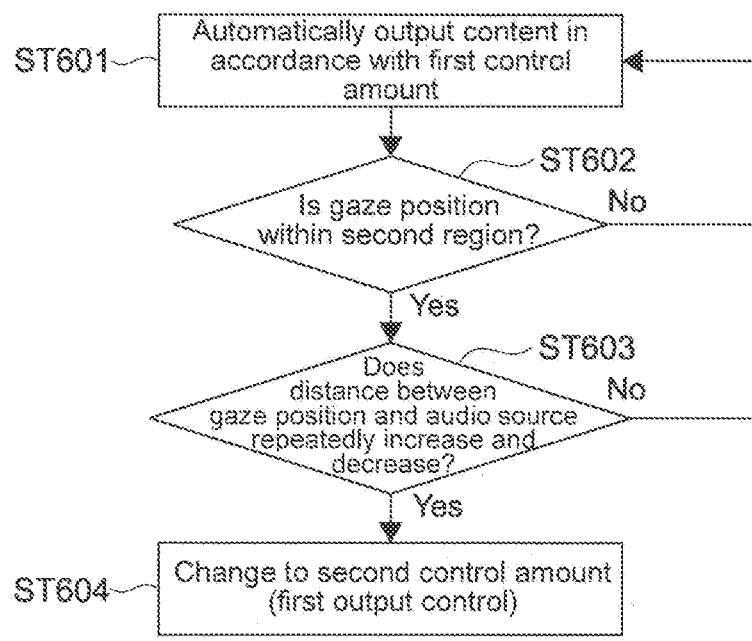
FIG. 12 is a flowchart illustrating another process example for determining an increase in a degree of interest in content.

FIG. 12 is a flowchart illustrating another process example for determining the increase in the degree of interest in the content. In the example illustrated in FIG. 12, the increase in the degree of interest in the content is determined on the basis of the change in the distance between the gaze position E and the television device 30 when the gaze position E is located in the second region R2. Specifically, when the distance between the gaze position E and the television device 30 repeatedly decreases and increases, it is determined that the degree of interest in the content increases, and the first output control is executed (Yes in step 602, Yes in step 603, and step 604).

This determination is a process executed on the basis of the motion of looking at the direction of the television device 30 furtively when the keyword of interest or the like comes to the ear. For example, when the user 1 works on the PC 10 or the like even though the user 1 is interested in the content, the user 1 may perform the motion of looking at the television device 30 furtively. The user 1 may move the line of sight until the television device 30 overlaps the central visual field CF, and the user 1 may slightly move the gaze position E toward the television device 30 during the work and move the gaze position E within a narrow range again. By detecting such a motion, it is possible to detect the increase in the degree of interest with a high degree of accuracy.

The distance between the gaze position E and the television device 30 may be calculated on the basis of the reference position S1 of the television device 30. Alternatively, it may be calculated on the basis of the edge B1. Further, a cycle or the like for determining the presence or absence of repetition of decrease and increase may be appropriately set.

Figure 13:
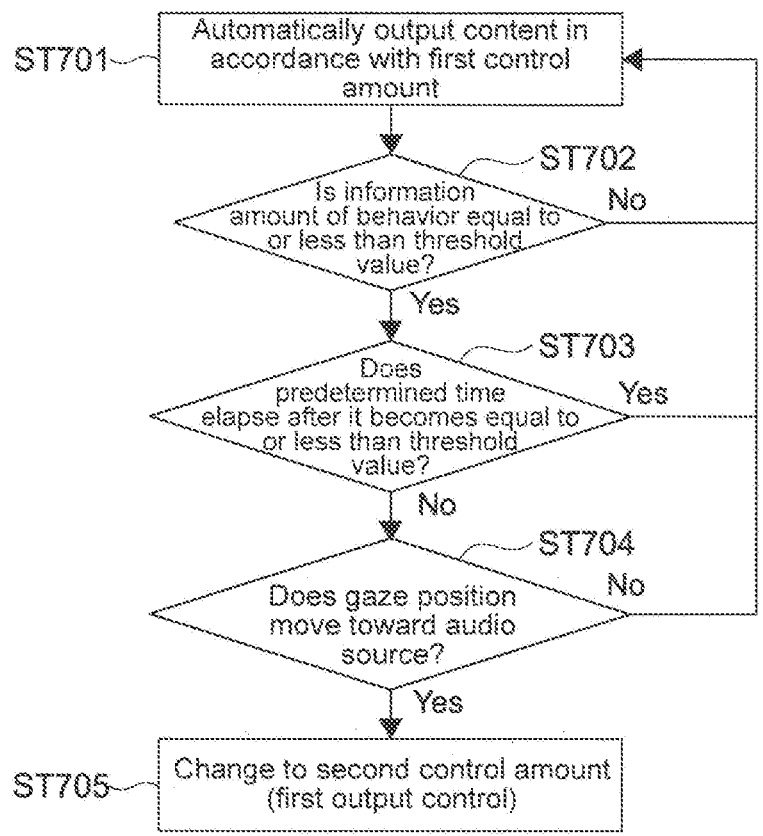
FIG. 13 is a flowchart illustrating another process example for determining an increase in a degree of interest in content.

FIG. 13 is a flowchart illustrating another process example for determining the increase in the degree of interest in the content. In the example illustrated in FIG. 13, it is determined whether or not the information amount of the behavior of the user 1 is equal to or less than a predetermined threshold value on the basis of the information related to the behavior of the user 1 acquired by the motion detecting unit 25 (step 702). The process can also be regarded as determining whether or not the amount of activity of the user 1 is equal to or less than a predetermined threshold value on the basis of the information related to the behavior of the user 1.

When the information amount of the behavior of the user 1 is not equal to or less than the threshold value (No in step 702), the process returns to step 701, and the reproduction of the content according to the first control amount is continued. When the information amount of the behavior of the user 1 is equal to or less than the threshold value (Yes in step 702), it is determined whether or not a predetermined time elapses on the basis of a time at which the information amount becomes equal to or less than the threshold value (step 703).

When the predetermined time elapses (Yes in step 703), the process returns to step 701, and the reproduction of the content according to the first control amount is continued. When the predetermined time does not elapse (No in step 703), it is determined whether or not the gaze position E moves toward the television device 30 (step 704). When the gaze position E does not move toward the television device 30 (No in step 704), the process returns to step 701, and the reproduction of the content according to the first control amount is continued. When the gaze position E moves toward the television device 30, the first output control according to the second control amount is executed (step 705).

As described above, in this example, the first output is executed when the gaze position E moves toward the television device 30 within a predetermined time based on a time at which the information amount of the behavior of the user 1 becomes equal to or less than a predetermined value, and when the information amount of the behavior of the user 1 is larger than the predetermined value, the first output control may not be executed.

Accordingly, it is possible to detect the reaction of the user 1 of stopping the work when the keyword of interest or the like comes to the ear and turning the line of sight toward the television device 30 with a high degree of accuracy, and it is possible to execute the first output control with a high degree of accuracy.

In the process illustrated in FIG. 13, it is possible to detect both a case in which the motion is stopped after the line of sight is moved and a case in which the motion is stopped before the line of sight is moved. Therefore, if both of these cases occur, the degree of interest in the content is determined to increase, and the first output control is executed.

The threshold value related to the information amount in step 702 may be set appropriately. Further, the predetermined time of step 703 may also be set arbitrarily, and, for example, a time which can be regarded as being related between the movement of the line of sight and the stop of the movement. Accordingly, it is possible to determine the increase in the degree of interest in the content with a high degree of accuracy.

Figure 14:
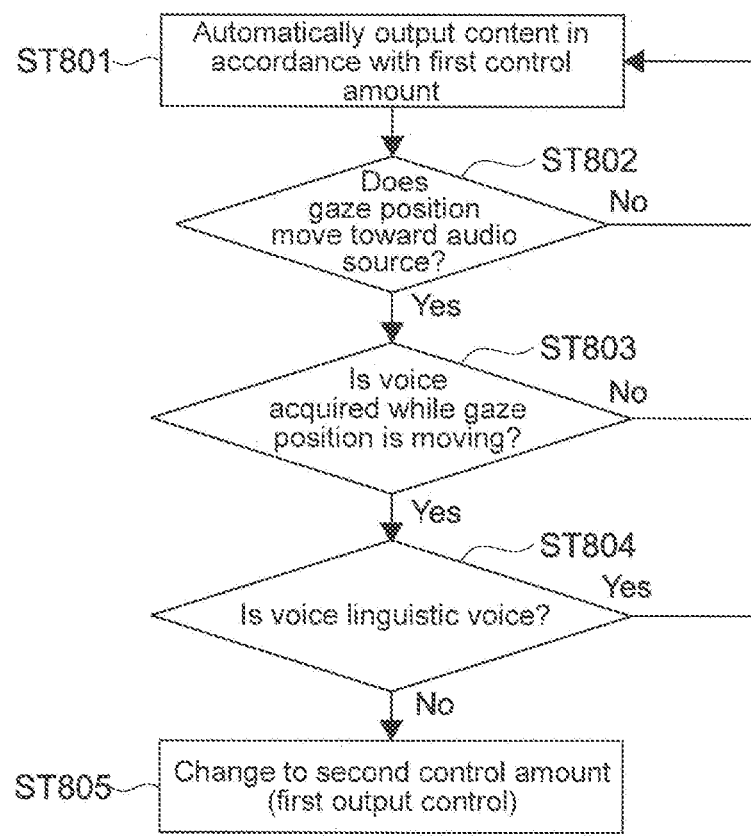
FIG. 14 is a flowchart illustrating another process example for determining an increase in a degree of interest in content.

FIG. 14 is a flowchart illustrating another process example for determining the increase in the degree of interest in the content. In the example illustrated in FIG. 14, it is determined whether or not the gaze position E moves toward the television device 30 (step 802). When the gaze position E does not move (No in Step 802), the process returns to Step 801, and the reproduction of the content according to the first control amount is continued.

When the gaze position E moves (Yes in step 802), it is determined whether or not a voice is acquired via the microphone 17 while the gaze position E is moving (step 803). When the voice is not acquired (No in step 803), the process returns to step 801, and the reproduction of the content according to the first control amount is continued. When the voice is acquired while the gaze position E is moving (Yes in step 803), it is determined whether or not the voice is a linguistic voice (step 804).

When the acquired voice is a linguistic voice, the process returns to step 801, and the reproduction of the content according to the first control amount is continued. When the voice is not a linguistic voice, it is assumed that a non-linguistic voice is spoken, and the first output control according to the second control amount is executed (step 805).

The determination result indicating that the acquired voice is not a linguistic voice in step 804 corresponds to the information related to the non-lingual voice. In other words, step 804 can be regarded as the determination of whether or not the information related to the non-lingual voice is acquired. When the information related to the non-lingual voice is not acquired, the reproduction of the content according to the first control amount is continued. When the information related to the non-lingual voice is acquired, the first output control according to the second control amount is executed.

As described above, when it is determined in step 804 that the acquired voice is not the voice of the language registered for voice input, it may be determined that the information related to the non-lingual voice is acquired, and the first output control according to the second control amount may be executed.

Thus, in the example illustrated in FIG. 14, when the information related to the non-lingual voice is acquired while the gaze position E is moving toward the television device 30, the first output control is executed, and when the information related to the non-lingual voice is not acquired while the gaze position E is moving toward the television device 30, the first output control may not be executed.

Accordingly, it is possible to detect the reaction of the user 1 of letting out a sound such as "Oh!" or "Yeah?" involuntarily when the word of interest comes to the ear with a high degree of accuracy, and it is possible to provide the substance of the content efficiently.

The process for determining the increase in the degree of interest of the user 1 in the content is not limited to the above example and may be set arbitrarily. For example, steps in the above-described flowcharts may be arbitrarily combined and executed. Also, each step in each flowchart may be executed as a process of determining the increase in the degree of interest in the content independently. For example, the determination step related to the information amount of the behavior of step 702 of FIG. 13 or the determination step related to the linguistic voice/non-lingual voice of step 804 of FIG. 14 may be implemented as the process of determining the increase in the degree of interest in the content independently. Besides, an arbitrary process may be performed.

Figure 15:
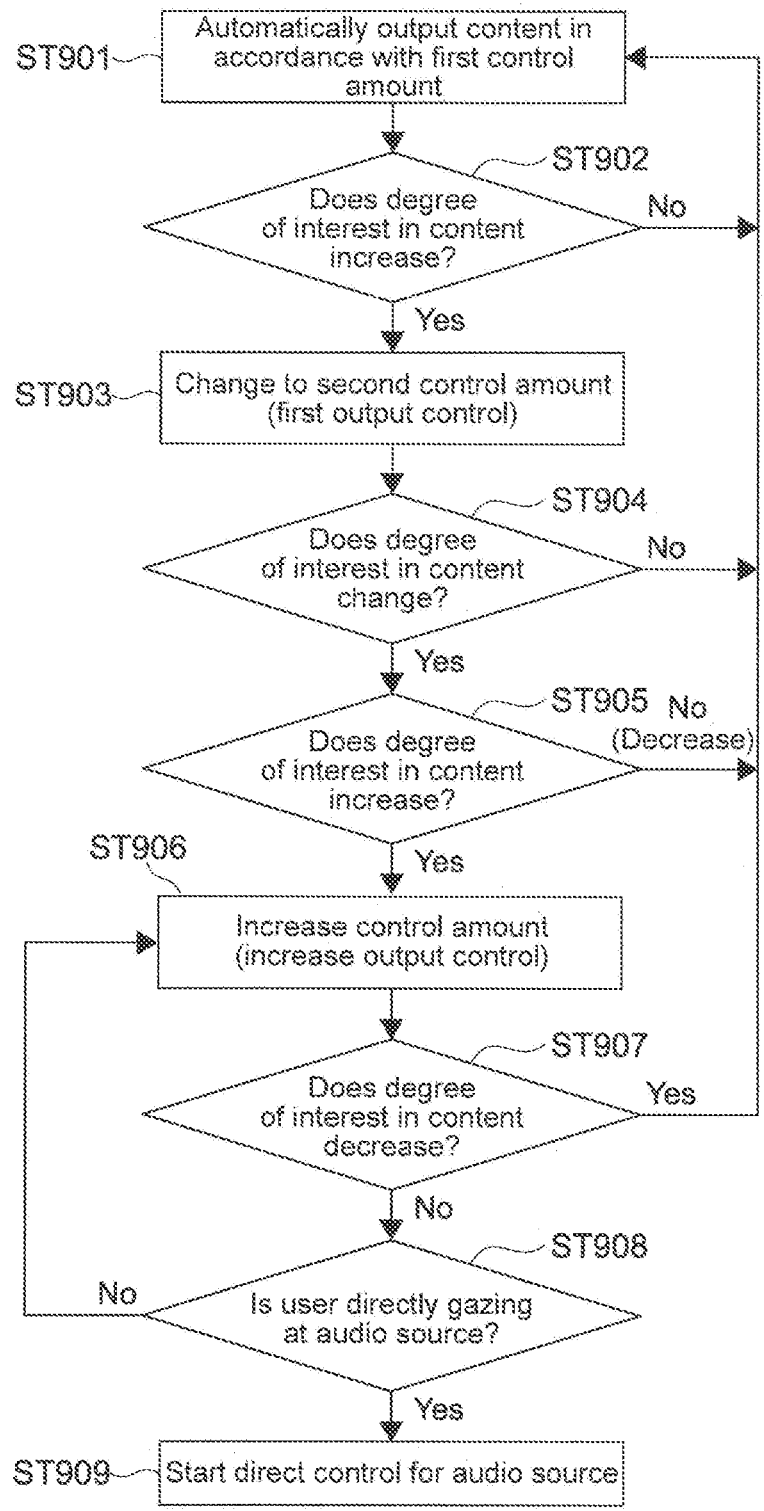
FIG. 15 is a flowchart illustrating another process example of content reproduction control.

FIG. 15 is a flowchart illustrating another process example of the content reproduction control. As illustrated in FIG. 15, after the first output control of the step 903 is executed, the control amount may be changed on the basis of the change in the degree of interest in the content.

For example, after the first output control is executed, it is determined whether or not the degree of interest in the content changes (step 904). When the change in the degree of interest is not detected (No in step 904), the process returns to step 901, and the content according to the first control amount is reproduced. In other words, the control amount is returned from the second control amount to the first control amount.

When the change in the degree of interest is detected (Yes in step 904), it is determined whether or not the change is an increase (step 905). When the change in the degree of interest is a decrease (No in step 905), the process returns to step 901, and the content is reproduced in accordance with the first control amount. When the change in the degree of interest is an increase (Yes in step 905), the control amount is increased, and increase output control of providing the substance of the content to the user 1 is executed in accordance with the increased control amount (step 906).

Thereafter, when the degree of interest in the content decreases (Yes in step 907), the process returns to step 901, and the content is reproduced in accordance with the first control amount. When the degree of interest does not decrease (No in step 907), it is determined whether or not the user 1 is directly gazing at the television device 30 (step 908). For example, when the gaze position E moves into the television device 30, it is determined that the user 1 is gazing at the television device 30. Alternatively, it may be determined that the user 1 is gazing at the television device 30 when the central visual field CF illustrated in FIG. 10 overlaps the television device 30.

When the user 1 is not gazing at the television device 30 (No in step 908), the process returns to step 906, and the output control according to the increased control amount is continued. When the user 1 is gazing at the television device 30, direct control for the television device 30 is started (step 909). The direct control for the television device 30 is typically output control different from the provision of the substance of the content. For example, switching of content to be provided, switching of a reproduction mode of the television device 30, power control, or the like are executed. Besides, various types of control using input by the line of sight may be combined, and known control may be executed.

Note that instead of step 908, it may be determined whether or not a gaze period of time in which the user 1 is gazing at the television device 30 is equal to or more than a predetermined threshold value. When the gaze time is equal to or more than the threshold value, that is, when the user 1 is gazing at the television device 30 for a predetermined period of time or more, the direct control for the television device 30 may be started.

As a specific example of the reproduction control of FIG. 15, in step 902, it is determined whether or not the gaze position E moves from within the second region R2, and when the determination result is positive, the first output control is executed. (step 903). In step 904, when the gaze position E is moving toward the television device 30, it is determined that the degree of content changes. In step 905, when the gaze position E moves into the first region R1, it is determined that the change of degree of interest is an increase. Then, the increase output control is executed in accordance with the increased control amount (step 906). In this case, the increased control amount corresponds to the fifth control amount, and the increased output control corresponds to the fourth output control. The second control amount is a value between the first control amount and the fifth control amount.

In step 907, when the gaze position E moves toward the television device 30 in the first region R1, it is determined that the degree of interest does not decrease (increase). Then, when the gaze position E moves onto the television device 30, the direct control for the television device 30 is started (step 909).

As described above, the output control of providing the substance of the content to the user 1 in accordance with the degree of interest in the content may be executed stepwise in accordance with different control amounts. Accordingly, it is possible to execute the content reproduction control according to the reaction or the like of the user 1 with a high degree of accuracy, and it is possible to provide the substance of the content efficiently.

A specific processing method for determining the degree of interest of the user 1 in the content such as steps 902, 904, 905, and 907 is not limited and may be set arbitrarily. For example, the process of each step of each flowchart described above, an arbitrary combination thereof, or the like may be used appropriately.

Figure 16:
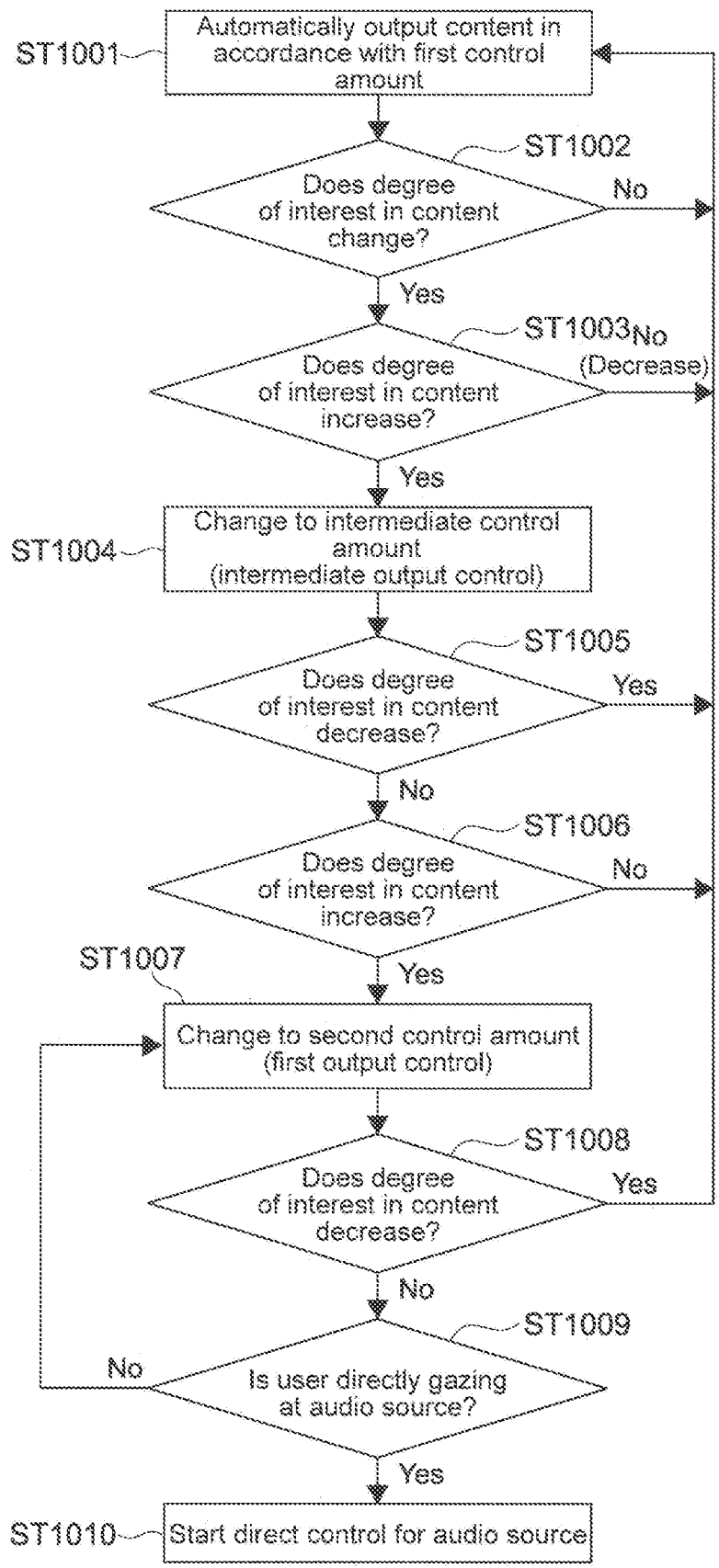
FIG. 16 is a flowchart illustrating another process example of stepwise output control.

FIG. 16 is a flowchart illustrating another process example of stepwise output control. As illustrated in FIG. 16, before the first output control is executed, intermediate output control of providing the substance of the content to the user in accordance with an intermediate control amount which is a value between the first control amount and the second control amount may be executed.

It is determined whether or not the degree of interest of the user 1 in the content changes while the content is being reproduced in accordance with the first control amount (step 1002). When the change in the degree of interest is not detected (No in step 1002), the process returns to step 1001, and the reproduction of the content according to the first control amount is continued.

When the change in the degree of interest is detected (Yes in step 1002), it is determined whether or not the change is an increase (step 1003). When the change in the degree of interest is a decrease (No in step 1003), the process returns to step 1001, and the reproduction of the content according to the first control amount is continued. When the change of degree of interest is an increase (Yes in step 1003), an intermediate output control according to the intermediate control amount is executed (step 1004).

Thereafter, when the degree of interest in the content decreases (Yes in step 1005), the process returns to step 1001, and the content is reproduced in accordance with the first control amount. In other words, the control amount is returned from the intermediate control amount to the first control amount. When the degree of interest does not decrease (No in step 1005), it is determined whether or not the degree of interest in the content increases, and when it is determined that the degree of interest increases, the first output control according to the second control amount is executed (Yes in step 1006 and step 1007).

When the degree of interest in the content decreases after the first output control (Yes in step 1008), the process returns to step 1001, and the content according to the first control amount is reproduced. In other words, the control amount is returned from the second control amount to the first control amount. When the degree of interest does not decrease (No in step 1008), it is determined whether or not the user 1 is directly gazing at the television device 30 (step 1009). When the user 1 is gazing at the television device 30 (Yes in step 1009), the direct control for the television device 30 is started (step 1010).

For example, when the gaze position E moves toward the television device 30 in the state in which the information amount of the behavior of the user 1 is larger than a predetermined value, the intermediate output control according to the intermediate control amount is executed. In this case, the intermediate control amount corresponds to the third control amount, and the intermediate output control corresponds to the second output control.

Then, when the information amount of the behavior of the user 1 becomes equal to or less than a predetermined value in the state in which the movement of the gaze position E is continued, the degree of interest in the content is determined to be further increased, and the first output control according to the second control amount is executed. With such stepwise output control, when only the line of sight is moved, the intermediate output control can be executed first, and when the motion of the user 1 is stopped, the first output control can be executed. As a result, it is possible to provide the substance of the content efficiently.

Also, for example, when the information related to the non-lingual voice is not acquired while the gaze position E is moving toward the television device 30, the intermediate output control according to the intermediate control amount is executed. In this case, the intermediate control amount corresponds to a fourth control amount, and the intermediate output control corresponds to a third output control. The fourth control amount may have the same value as or a different value from the third control amount described above.

Then, when information related to non-source speech is acquired in the state in which the movement of the gaze position E is continued, the degree of interest in the content is determined to be further increased, and the first output control according to the second control amount is executed. With such gradual output control, when only the line of sight moves, the intermediate output control can be executed first, and the first output control can be executed in accordance with the reaction of the non-lingual voice such as "Oh!" or "Yeah?." As a result, it is possible to provide the substance of the content efficiently.

A specific processing method for determining the degree of interest of the user 1 in the content such as steps 1002, 1003, 1005, 1006 and 1007 is not limited and may be set arbitrarily. For example, the process of each step of each flowchart described above, an arbitrary combination thereof, or the like may be used appropriately.

For example, the voice and the motion of the user 1 may be determined at the same time, and the degree of interest may be determined in multiple steps in multiple modals. Of course, multiple modals may be analyzed by deep learning or the like, and weighting of each modal used for intention estimation of the user 1 may be controlled/changed appropriately.

Figure 17:
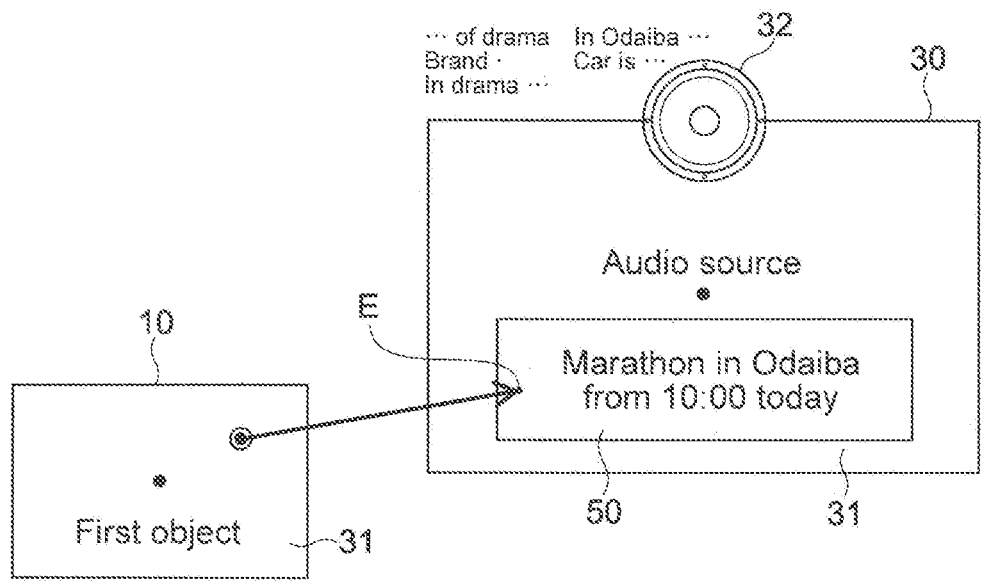
FIG. 17 is a diagram for describing another example of first output control which is executed in accordance with an increase in a degree of interest of a user in content.

FIG. 17 is a diagram for describing another example of the first output control which is executed in accordance with the increase in the degree of interest of the user 1 in the content. For example, the first output control may be executed by controlling a display unit within the field of view of the user 1. In the example illustrated in FIG. 17, the display unit 31 of the television device 30 functioning as the audio source is controlled, but a display device different from the device functioning as the audio source may be controlled as a display unit.

As illustrated in FIG. 17, when, for example, the keyword is reproduced from the television device 30 as the substance of the content, it is assumed that the reaction of the user 1 to a keyword "Odaiba" is detected. In this case, a subtitle 50 of content related to "Odaiba" such as an event to be held in Odaiba is displayed. Accordingly, the user 1 can understand the substance of the content related to the keyword of interest in detail.

Further, the first output control may be executed by controlling the display unit such that at least a part of a reproduction history of the substance of the content is displayed. For example, the reproduction history to be displayed is selected and displayed on the display unit in accordance with a keyword or a timing at which the reaction of the user 1 is detected or the like. Accordingly, it is possible to understand the substance of the content which has been reproduced in the past. As the reproduction history, the substance reproduced in the past may be reproduced without change, or a summary may be reproduced.

Further, a specific control method for the display unit is not limited, and arbitrary control capable of providing the details of content or the like to the user 1 may be executed. For example, as illustrated in FIG. 17, the display unit 31 may be controlled such that display related to the substance of the content is performed in accordance with the gaze position E of the user 1. Accordingly, it is possible to gaze at information related to the content naturally.

As described above, in the content provision system according to the present embodiment, the information related to the gaze position E of the user 1, the position information of the television device 30 that reproduces the content, and the position information of the PC 10 gazed at by the user 1 are acquired respectively. When the gaze position E within the PC 10 moves toward the television device 30, the first output control according to the second control amount is executed. Accordingly, it is possible to perform the reproduction control according to, for example, the reaction of the user 1 and to provide the substance of the content efficiently.

For example, during the work, even when a visual notification indicating that the group has been configured and a conversation has started is displayed on the display unit 13 such as the PC 10, such notification is often not noticed. On the other hand, if an attempt to notify all the substances of the conversation is made in response to the start of the conversation or the like, it is unclear whether or not the user 1 is interested in at this time. Therefore, it may be troublesome for the user 1 and may interfere with the work.

In the present embodiment, for example, the content is reproduced in accordance with the first control amount of the degree at which the work of the user 1 is not disturbed, and the keyword of interest or the like is picked up by the cocktail party effect. Further, the first output control according to the second control amount in which the control amount is increased is executed in response to the increase in the degree of interest of the user 1 in the content. Accordingly, it is possible to provide the user 1 with the details of the substance of the content in which the user 1 is interest or the like at an appropriate timing. Further, it is possible for the user 1 to participate in the conversation of the group at a timing when the substance in which the user 1 is interested is being discussed and enjoy communication.

Also, as illustrated in FIGS. 15 and 16, since it is possible to perform the stepwise output control according to different control amounts, for example, when the user 1 responds to content once and then returns to the work again, a flexible process of returning the control amount to a small value is possible.

The present technology can be applied to arbitrary content such as chat conversation, automatic reading of an e-mail, automatic reading of news, voices of a moving image being reproduced, or the like.

Other Embodiments

The present technology is not limited to the embodiment described above, and various other embodiments can be realized.

Figure 18:
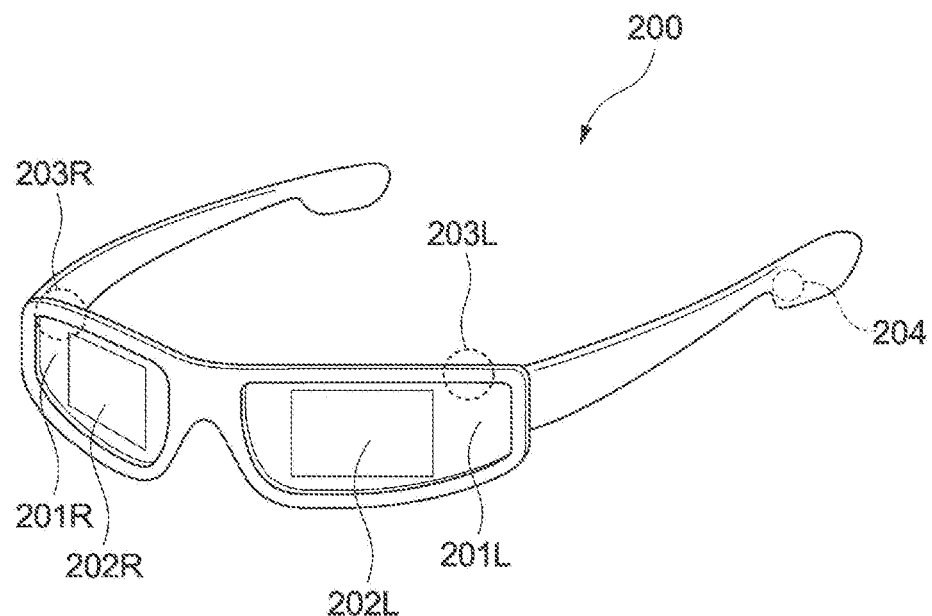
FIG. 18 is a perspective view illustrating a configuration example of a head mounted display according to the present technology.
Figure 19:
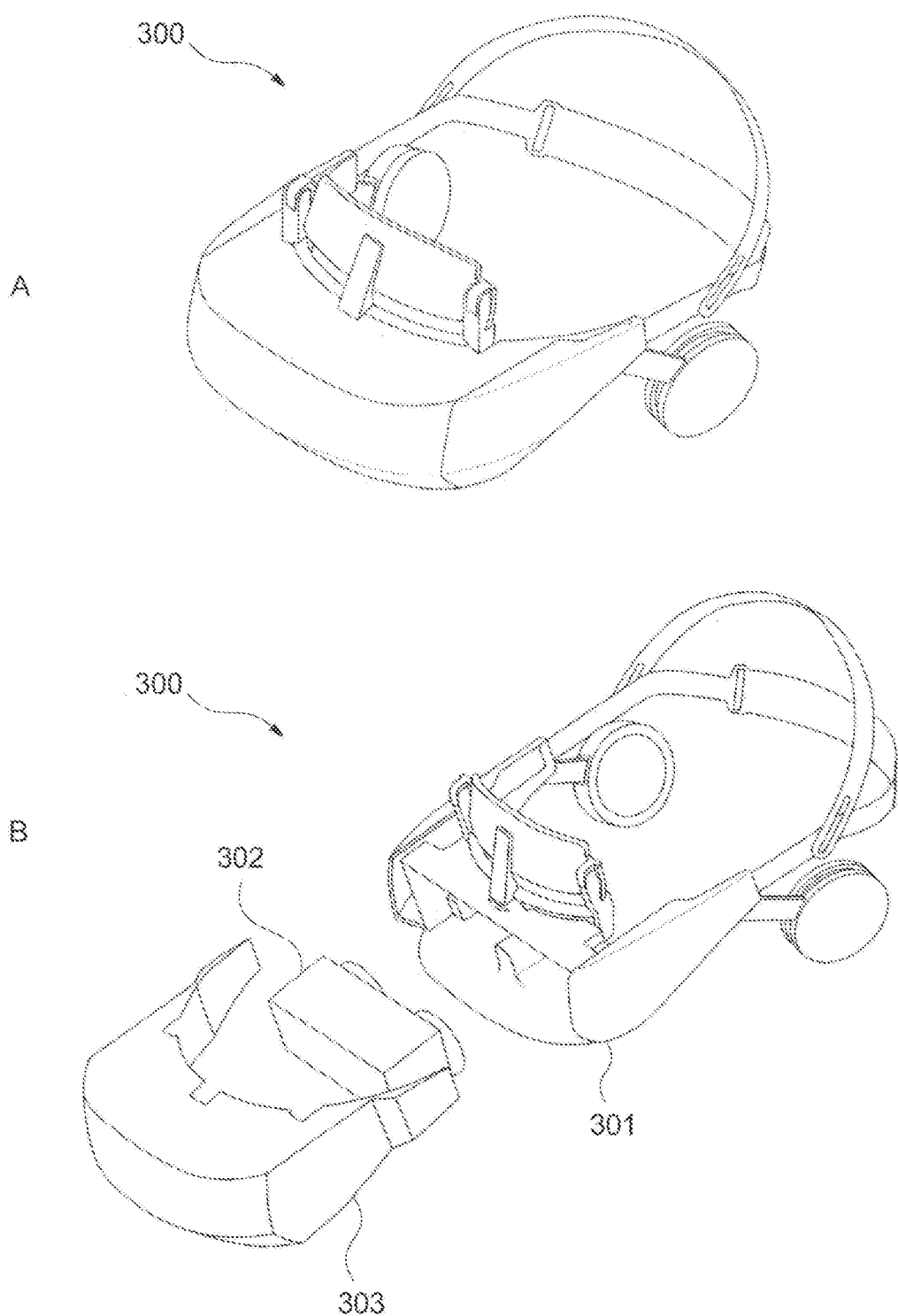
FIG. 19 is a perspective view illustrating a configuration example of a head mounted display according to the present technology.

FIGS. 18 and 19 are perspective views illustrating an example of a configuration of a head mounted display (HMD) which can be used as the information processing device according to the present technology.

An HMD 200 illustrated in FIG. 18 is a glasses-type device including a transmissive type display and is used in a state in which it is worn the head of the user 1. The HMD 200 includes left and right lenses 201L and 201R, left and right eye displays 202L and 202R, left and right eye cameras 203L and 203R, and a sensor unit 204.

The left and right lenses 201L and 201R are placed in front of the left and right eyes of the user, respectively. The left and right eye displays 202L and 202R are installed in the left and right lenses 201L and 201R, respectively, to cover the visual field of the user 1.

The left and right eye displays 202L and 202R are transmissive type displays and display left and right eye images, respectively. The user 1 who wears the HMD 200 can visually recognize the real scenery while visually recognizing the images displayed on the respective displays. Accordingly, the user can experience augmented reality (AR) or the like.

Note that a light control element (not illustrated) or the like may be installed on the outsides of the left and right eye displays 202L and 202R (the side opposite to the eyes of the user 1). The light control element is an element capable of adjusting the quantity of light passing through the element. Since the light control element is installed, for example, it is possible to restrict the actual scenery which passes through the respective displays and is recognized by the user, emphasize images displayed on the respective displays, and cause the user to visually recognize them. Accordingly, the user can experience virtual reality (VR) or the like.

As the left and right eye displays 202L and 202R, for example, a transmissive type organic EL display, a liquid crystal display (LCD) display, or the like is used. Further, for example, a light control glass capable of electrically controlling transmittance, a light control sheet, a liquid crystal shutter, or the like is used as the light control element.

The left and right eye cameras 203L and 203R are installed at arbitrary positions at which the left and right eyes of the user can be imaged. For example, the information related to the gaze position E such as the line of sight direction is acquired on the basis of the images of the left eye and the right eye captured by the left and right eye cameras 203L and 203R.

For example, digital cameras including an image sensor such as a complementary metal-oxide semiconductor (CMOS) sensor or a charge coupled device (CCD) sensor are used as the left and right eye cameras 203L and 203R. Also, for example, an infrared camera including infrared illumination such as an infrared LED may be used.

The sensor unit 204 includes, for example, an acceleration sensor, a gyro sensor, a geomagnetic sensor (a 9-axis sensor), or the like, and acquires the information related to the behavior of the user 1 including the motion or the posture (running, walking, stopping, or the like) of the user 1. The information related to the gaze position E such as the line of sight direction may be acquired on the basis of the direction of the head (face) of the user 1 detected by the sensor unit 204. Further, a sensor capable of acquiring biological information of the user such as a heart rate sensor, a sweat sensor, a temperature (body temperature) sensor, or an electroencephalogram sensor may be installed as the sensor unit 204. Then, the increase in the degree of interest of the user 1 in the content or the like may be detected on the basis of a change in the biological information of the user 1 or the like.

FIG. 19A is a perspective view schematically illustrating an external appearance of an HMD 300. FIG. 19B is a perspective view schematically illustrating a state in which the HMD 300 is disassembled. The HMD 300 includes a mount unit 301 worn on the head of the user 1, a display unit 302 installed in front of both eyes of the user 1, and a cover unit 303 configured to cover the display unit 302. The HMD 300 is an immersive type head mounted display configured to cover the visual field of the user and is used as an HMD for virtual reality (VR).

The content provision system according to the present technology may be realized by the HMD 200 or 300 illustrated in FIG. 18 or 19 instead of the PC 10 illustrated in FIG. 1. For example, the content output control according to the increase in the degree of interest of the user 1 in the content or the like may be executed in an AR space including the television device 30 functioning as the audio source in a state in which the HMD 200 is worn. Also, the content output control according to the increase in the degree of interest of the user 1 in the content or the like may be executed within the VR space which can be experienced in the state in which the HMD 300 is worn. In this case, the audio source that reproduces the content is installed in the VR space, and the content is reproduced by a speaker or the like installed in the HMD 300. In other words, in the present technology, the "space in which the user is located" includes both a real space and a virtual space.

Figure 20:
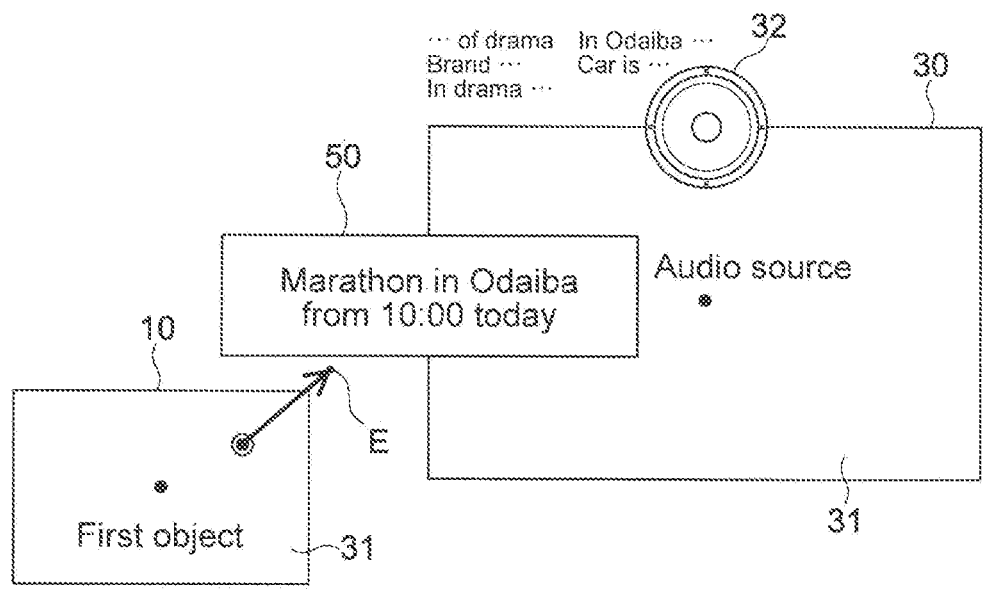
FIG. 20 is a diagram for describing a control example of a display unit serving as a first output control.

FIG. 20 is a diagram for describing a control example of a display unit as a first output control. For example, when the HMD 200 or 300 is worn, it is possible to freely control the display related to the substance of the content in the AR space or the VR space. For example, it is also possible to place a subtitle 50 or the like of the substance of the content between the gaze position E and the television device 30 as illustrated in FIG. 20. In other words, it is possible to move the display related to the content in accordance with the line of sight of the user 1, and it is also possible to display it on the end of the line of sight or a point to the line of sight is moved. Accordingly, it is possible to gaze at the information related to the content naturally.

A plurality of pieces of content may be reproduced at the same time as the content reproduction method according to the first control amount. For example, conversations by a plurality of groups are reproduced at the same timing. In this case, the conversations in each group may be reproduced in turn at predetermined time intervals so that the conversation of each group can be easily distinguished. For example, when there are groups A to D, conversations are reproduced in order from the group A to D at intervals of two minutes.

For example, when an audio source capable of performing multi-channel reproduction or the like is used, a plurality of pieces of content may be reproduced from different channels. Also, a plurality of pieces of content may be reproduced with different volume, different sound qualities, different orientations, or the like. Accordingly, it is possible to provide the user 1 with the substances of a plurality of pieces of content efficiently.

Arbitrary output control may be set appropriately as the content reproduction according to the first control amount, the first output control according to the second control amount, the intermediate output control according to the intermediate control amount, and the increase output control according to the increased control amount.

The example in which the information processing method according to the present technology is executed by a computer such as the PC 10 or the HMD 200 or 300 operated by the user 1 has been described above. However, the information processing method and the program according to the present technology may be executed by another computer capable of communicating with the computer operated by the user 1 via a network or the like. Also, the computer operated by the user 1 may be linked with another computer to construct the content provision system according to the present technology.

In other words, the information processing method and the program according to the present technology can be executed not only in a computer system constituted by a single computer but also in a computer system in which a plurality of computers operates in conjunction with each other. In the present disclosure, the system means an aggregate of a plurality of components (devices, modules (parts), or the like), and it does not matter whether or not all components are in the same housing. Therefore, a plurality of devices which is accommodated in separate housings and connected via a network and a single device in which a plurality of modules is accommodated in a single housing are all systems.

Execution of the information processing method and the program according to the present technology by the computer system includes, for example, both a case in which the acquisition of the user information, the acquisition of each piece of position information, the content output control according to each control amount, and the like are executed by a single computer and a case in which the respective processes are executed by different computers. Also, the execution of each process by a predetermined computer includes an operation of causing other computers to execute some or all of the processes and acquiring the results.

In other words, the information processing method and the program according to the present technology can also be applied to a configuration of cloud computing in which one function is shared and processed by a plurality of devices via a network.

Among the features according to the present technology described above, at least two features may be combined. In other words, various features described in each embodiment may be combined arbitrarily without distinction of each embodiment. Further, various effects described above are merely examples and are not limited, and other effects may be included.

Note that the present technology may also have the following configurations.

(1) An information processing device, including:
a user information acquiring unit acquiring information related to a gaze position of a user while a substance of content is being automatically reproduced, in accordance with a first control amount, from an audio source located in a space in which the user is located;
an object information acquiring unit acquiring position information related to the audio source and position information related to a first object gazed at by the user; and
an output control unit performing first output control of providing the user with the substance of the content in accordance with a second control amount different from the first control amount in a case where the gaze position within the first object moves toward the audio source.

(2) The information processing device according to (1), in which
the object information acquiring unit acquires position information related to a second object different from the audio source located in the space, and
the output control unit does not perform the first output control in a case where the gaze position is moving toward the second object rather than the audio source.

(3) The information processing device according to (1) or (2), in which
the output control unit performs the first output control in a case where the gaze position moves to an outside of the first object while moving toward the audio source, and does not perform the first output control in a case where the gaze position remains in the first object while moving toward the first object.

(4) The information processing device according to any one of (1) to (3), in which
the output control unit performs the first output control in a case where the gaze position moves from the second region outside the first region surrounding the audio source toward the audio source.

(5) The information processing device according to (4), in which
the output control unit performs the first output control in a case where a distance between the gaze position and the audio source repeatedly decreases and increases when the gaze position is positioned within the second region.

(6) The information processing device according to (4) or (5), in which
a width of the first region surrounding the audio source is equal to or more than half a radius of a central visual field of the user on the basis of a view point of the user.

(7) The information processing device according to any one of (1) to (6), in which
the user information acquiring unit acquires information related to a behavior of the user different from the information related to the gaze position, and
the output control unit performs the first output control in a case where the gaze position moves toward the audio source within a predetermined period of time on the basis of a time at which an information amount of the behavior of the user becomes equal to or less than a predetermined value and does not perform the first output control in a case where the information amount of the behavior of the user is larger than the predetermined value.

(8) The information processing device according to (7), in which
the output control unit performs second output control of providing the user with the substance of the content in accordance with a third control amount which is a value between the first control amount and the second control amount in a case where the gaze position moves toward the audio source in a state in which the information amount of the behavior of the user is larger than the predetermined value.

(9) The information processing device according to any one of (1) to (8), in which the user information acquiring unit acquires information related to a voice of the user, and the output control unit performs the first output control in a case where the user information acquiring unit acquires information on a non-lingual voice of the user while the gaze position is moving toward the audio source and does not perform the first output control in a case where the user information acquiring unit does not acquire the information related to the non-lingual voice of the user while the gaze position is moving toward the audio source.

(10) The information processing device according to (9), in which the output control unit performs a third output control of providing the user with the substance of the content in accordance with a fourth control amount which is a value between the first control amount and the second control amount in a case where the user information acquiring unit does not acquire the information related to the non-lingual voice of the user while the gaze position is moving toward the audio source.

(11) The information processing device according to any one of (1) to (10), in which the output control unit performs the first output control by controlling the audio source.

(12) The information processing device according to (11), in which the first control amount and the second control amount are associated with at least a volume of the audio source, and the output control unit performs the first output control by increasing the volume of the audio source.

(13) The information processing device according to (11) or (12), in which the first control amount and the second control amount are associated with at least an information amount of the substance of the content to be reproduced.

(14) The information processing device according to (13), in which the output control unit performs the first output control by reproducing at least a part of the substance of the content reproduced immediately before the gaze position moves toward the audio source.

(15) The information processing device according to (13) or (14), in which the output control unit performs the first output control by increasing an amount of a keyword to be reproduced in a case where the audio source extracts the keyword from the substance of the content and reproduces the keyword.

(16) The information processing device according to any one of (1) to (15), in which the output control unit performs the first output control by controlling a display unit within a field of view of the user.

(17) The information processing device according to (16), in which the output control unit performs the first output control by controlling the display unit such that at least a part of a reproduction history of the substance of the content is displayed.

(18) The information processing device according to (16) or (17), in which the output control unit performs the first output control by controlling the display unit such that a subtitle of the substance of the content being reproduced is displayed.

(19) An information processing method executed by a computer system, including:

acquiring information related to a gaze position of a user while a substance of content is being automatically reproduced, in accordance with a first control amount, from an audio source located in a space in which the user is located;

acquiring position information related to the audio source and position information related to a first object gazed at by the user; and performing first output control of providing the user with the substance of the content in accordance with a second control amount different from the first control amount in a case where the gaze position within the first object moves toward the audio source.

(20) A program causing a computer system to execute:

a step of acquiring information related to a gaze position of a user while a substance of content is being automatically reproduced, in accordance with a first control amount, from an audio source located in a space in which the user is located;

a step of acquiring position information related to the audio source and position information related to a first object gazed at by the user; and a step of performing first output control of providing the user with the substance of the content in accordance with a second control amount different from the first control amount in a case where the gaze position within the first object moves toward the audio source.

(21) The information processing device according to any one of (1) to (18), in which the output control unit performs the first output control in a case where the gaze position substantially stops immediately after the gaze position moves toward the audio source, and does not perform the first output control while the gaze position is continuously moving toward the audio source.

(22) The information processing device according to any one of (4) to (6), in which the output control unit performs fourth output control of providing the user with the substance of the content in accordance with a fifth control amount different from the first control amount and the second control amount in a case where the gaze position moves into the first region, and the second control amount is a value between the first control amount and the fifth control amount.

(23) The information processing device according to any one of (4) to (7), in which the output control unit performs output control different from the provision of the substance of the content in a case where the gaze position moves onto the audio source.

(24) The information processing device according to any one of (1) to (18), in which the first control amount and the second control amount relate to a reproduction speed of the substance of the content, and the output control unit performs the first output control by decreasing the reproduction speed of the substance of the content.

(25) The information processing device according to any one of (13) to (15), in which the output control unit performs the first output control by reproducing the substance of the content which is more detailed than a summary of the substance of the content in a case where the audio source reproduces the summary.

(26) The information processing device according to any one of (16) to (18), in which
the output control unit performs the first output control by controlling the display unit such that display related to the substance of the content is placed at the gaze position or between the gaze position and the audio source.

REFERENCE SIGNS LIST

E gaze position
R1 first region
R2 second region
2 space
10 PC
21 content analyzing unit
22 output audio control unit
23 audio source control unit
24 line of sight detecting unit
26 motion detecting unit
26 voice determining unit
30 television device
31 display unit
32 speaker
40 timepiece
100 content provision system
200, 300 HMD

The invention claimed is:

1. An information processing device, comprising:
a user information acquiring unit configured to acquire information related to a gaze position of a user while a substance of content is being automatically reproduced, in accordance with a first control amount, from an audio source located in a space in which the user is located;
an object information acquiring unit configured to acquire position information related to the audio source and position information related to a first object gazed at by the user; and
an output control unit configured to perform first output control of providing the user with the substance of the content in accordance with a second control amount different from the first control amount based on the gaze position within the first object moving toward the audio source, wherein
the user information acquiring unit is further configured to acquire information related to a voice of the user,
the output control unit is further configured to determine, while the gaze position is moving toward the audio source, whether or not to perform the first output control based on a determination of whether or not the acquired information related to the voice of the user includes information on a non-lingual voice of the user, and
the user information acquiring unit, the object information acquiring unit, and the output control unit are each implemented via at least one processor.

2. The information processing device according to claim 1, wherein
the object information acquiring unit is further configured to acquire position information related to a second object different from the audio source located in the space, and
the output control unit is further configured to not perform the first output control based on the gaze position moving toward the second object rather than the audio source.

3. The information processing device according to claim 1, wherein
the output control unit is further configured to
perform the first output control based on the gaze position moving to an outside of the first object while moving toward the audio source, and
not perform the first output control based on the gaze position remaining in the first object while moving toward the first object.

4. The information processing device according to claim 1, wherein
the output control unit is further configured to perform the first output control based on the gaze position moving from a second region outside a first region surrounding the audio source toward the audio source.

5. The information processing device according to claim 4, wherein
the output control unit is further configured to perform the first output control based on a distance between the gaze position and the audio source repeatedly decreasing and increasing when the gaze position is positioned within the second region.

6. The information processing device according to claim 4, wherein
a width of the first region surrounding the audio source is equal to or more than half a radius of a central visual field of the user on a basis of a view point of the user.

7. The information processing device according to claim 1, wherein
the user information acquiring unit is further configured to acquire information related to a behavior of the user different from the information related to the gaze position, and
the output control unit is further configured to
perform the first output control based on the gaze position moving toward the audio source within a predetermined period of time on a basis of a time at which an information amount of the behavior of the user becomes equal to or less than a predetermined value, and
not perform the first output control based on the information amount of the behavior of the user being larger than the predetermined value.

8. The information processing device according to claim 7, wherein
the output control unit is further configured to perform second output control of providing the user with the substance of the content in accordance with a third control amount which is a value between the first control amount and the second control amount based on the gaze position moving toward the audio source in a state in which the information amount of the behavior of the user is larger than the predetermined value.

9. The information processing device according to claim 1, wherein
the output control unit is further configured to
perform the first output control based on the acquired information related to the voice of the user including information on the non-lingual voice of the user while the gaze position is moving toward the audio source, and
not perform the first output control based on the acquired information related to the voice of the user not including the information on the non-lingual voice of the user while the gaze position is moving toward the audio source.

10. The information processing device according to claim 9, wherein
the output control unit is further configured to perform a third output control of providing the user with the substance of the content in accordance with a fourth control amount which is a value between the first control amount and the second control amount based on the user information acquiring unit not acquiring the information related to the non-lingual voice of the user while the gaze position is moving toward the audio source.

11. The information processing device according to claim 1, wherein
the output control unit is further configured to perform the first output control by controlling the audio source.

12. The information processing device according to claim 11, wherein
the first control amount and the second control amount are associated with at least a volume of the audio source, and
the output control unit is further configured to perform the first output control by increasing the volume of the audio source.

13. The information processing device according to claim 11, wherein
the first control amount and the second control amount are associated with at least an information amount of the substance of the content to be reproduced.

14. The information processing device according to claim 13, wherein
the output control unit is further configured to perform the first output control by reproducing at least a part of the substance of the content reproduced immediately before the gaze position moves toward the audio source.

15. The information processing device according to claim 13, wherein
the output control unit is further configured to perform the first output control by increasing an amount of a keyword to be reproduced based on the audio source extracting the keyword from the substance of the content and reproduce the keyword.

16. The information processing device according to claim 1, wherein
the output control unit is further configured to perform the first output control by controlling a display unit within a field of view of the user.

17. The information processing device according to claim 16, wherein
the output control unit is further configured to perform the first output control by controlling the display unit such that at least a part of a reproduction history of the substance of the content is displayed.

18. The information processing device according to claim 16, wherein
the output control unit is further configured to perform the first output control by controlling the display unit such that a subtitle of the substance of the content being reproduced is displayed.

19. An information processing method executed by a computer system, comprising:
acquiring information related to a gaze position of a user while a substance of content is being automatically reproduced, in accordance with a first control amount, from an audio source located in a space in which the user is located;
acquiring position information related to the audio source and position information related to a first object gazed at by the user;
performing first output control of providing the user with the substance of the content in accordance with a second control amount different from the first control amount based on the gaze position within the first object moving toward the audio source; and
acquiring information related to a voice of the user,
wherein the performing of the first output control includes determining, while the gaze position is moving toward the audio source, whether or not to perform the first output control based on a determination of whether or not the acquired information related to the voice of the user includes information on a non-lingual voice of the user.

20. A non-transitory computer-readable medium having embodied thereon a program, which when executed by a computer causes the computer to execute an information processing method, the method comprising:
acquiring information related to a gaze position of a user while a substance of content is being automatically reproduced, in accordance with a first control amount, from an audio source located in a space in which the user is located;
acquiring position information related to the audio source and position information related to a first object gazed at by the user;
performing first output control of providing the user with the substance of the content in accordance with a second control amount different from the first control amount based on the gaze position within the first object moving toward the audio source; and
acquiring information related to a voice of the user,
wherein the performing of the first output control includes determining, while the gaze position is moving toward the audio source, whether or not to perform the first output control based on a determination of whether or not the acquired information related to the voice of the user includes information on a non-lingual voice of the user.

* * * * *